(12) United States Patent
Khoshnevisan et al.

(10) Patent No.: US 11,711,833 B2
(45) Date of Patent: Jul. 25, 2023

(54) BEAMS FOR SEMI-PERSISTENT SCHEDULING

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Yan Zhou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 121 days.

(21) Appl. No.: 17/304,688

(22) Filed: Jun. 24, 2021

(65) Prior Publication Data

US 2021/0410145 A1 Dec. 30, 2021

Related U.S. Application Data

(60) Provisional application No. 63/045,584, filed on Jun. 29, 2020.

(51) Int. Cl.
*H04W 72/04* (2023.01)
*H04W 72/53* (2023.01)
*H04W 72/1263* (2023.01)
*H04W 72/044* (2023.01)
*H04W 72/23* (2023.01)

(52) U.S. Cl.
CPC ......... *H04W 72/53* (2023.01); *H04W 72/046* (2013.01); *H04W 72/1263* (2013.01); *H04W 72/23* (2023.01)

(58) Field of Classification Search
CPC ........... H04W 72/0493; H04W 72/042; H04W 72/046; H04W 72/1263; H04L 5/0053; H04L 5/0023
See application file for complete search history.

(56) References Cited

U.S. PATENT DOCUMENTS

2017/0195998 A1* 7/2017 Zhang .................. H04L 5/0057
2019/0320469 A1* 10/2019 Huang ................. H04W 72/14
2021/0022128 A1 1/2021 Chen et al.

FOREIGN PATENT DOCUMENTS

WO 2019213921 A1 11/2019

OTHER PUBLICATIONS

International Search Report and Written Opinion—PCT/US2021/070774—ISA/EPO—dated Nov. 5, 2021.

* cited by examiner

*Primary Examiner* — Kiet Tang
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) that activates a semi-persistent scheduling (SPS) configuration. The UE may receive SPS transmissions in a plurality of SPS occasions that are according to the SPS configuration using at least one beam that is based at least in part on: whether a scheduling offset between the DCI and the plurality of SPS occasions satisfies a threshold time duration, whether a transmission configuration indicator (TCI) state, associated with a control resource set that carries the DCI and is used to determine the at least one beam, changes while the SPS configuration is active, or whether a mapping of a TCI identifier, indicated by the DCI, to one or more TCI states changes while the SPS configuration is active. Numerous other aspects are described.

30 Claims, 11 Drawing Sheets

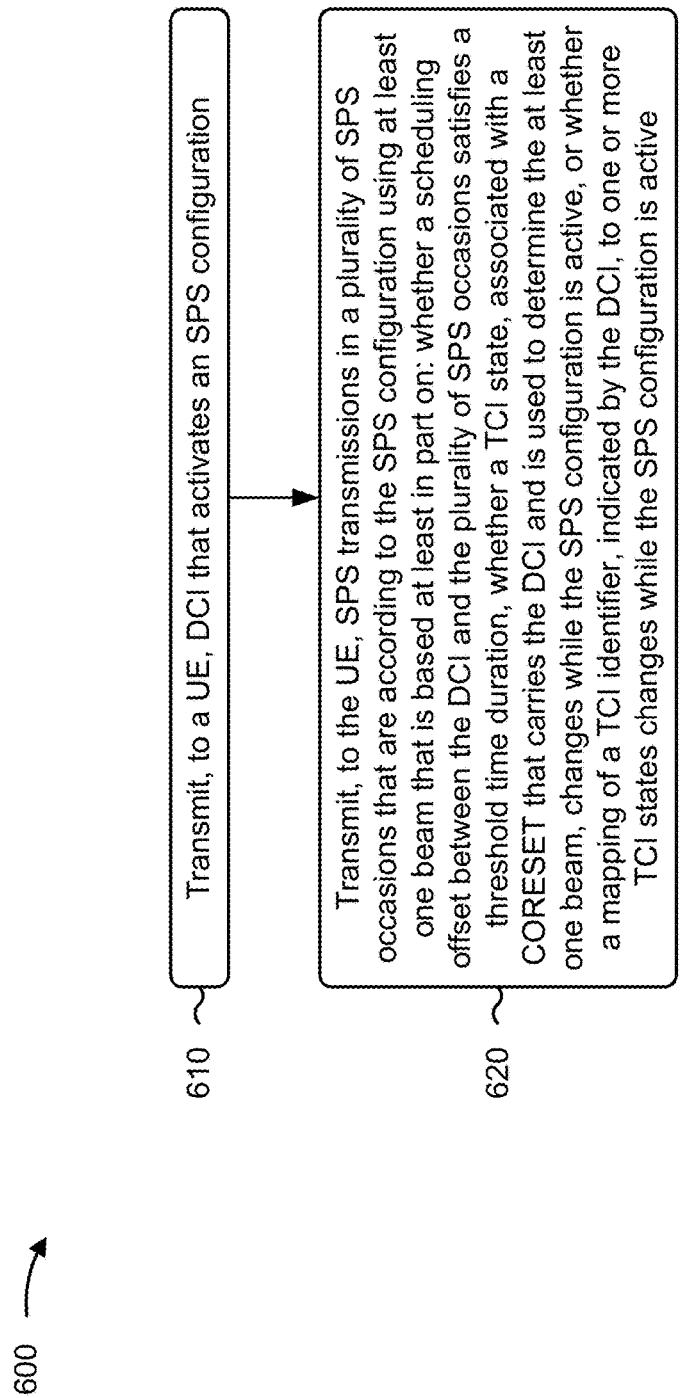

BEAMS FOR SEMI-PERSISTENT SCHEDULING

CROSS-REFERENCE TO RELATED APPLICATION

This Patent Application claims priority to U.S. Provisional Patent Application No. 63/045,584, filed on Jun. 29, 2020, entitled "BEAMS FOR SEMI-PERSISTENT SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beams for semi-persistent scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a base station, downlink control information (DCI) that activates a semi-persistent scheduling (SPS) configuration. The one or more processors may be configured to receive, from the base station, SPS transmissions in a plurality of SPS occasions that are according to the SPS configuration using at least one beam that is based at least in part on: whether a scheduling offset between the DCI and the plurality of SPS occasions satisfies a threshold time duration, whether a transmission configuration indicator (TCI) state, associated with a control resource set (CORESET) that carries the DCI and is used to determine the at least one beam, changes while the SPS configuration is active, or whether a mapping of a TCI identifier, indicated by the DCI, to one or more TCI states changes while the SPS configuration is active.

Some aspects described herein relate to a base station for wireless communication. The base station may include a memory and one or more processors coupled to the memory. The one or more processors may be configured to transmit, to a UE, DCI that activates an SPS configuration. The one or more processors may be configured to transmit, to the UE, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active.

Some aspects described herein relate to a method of wireless communication performed by a UE. The method may include receiving, from a base station, DCI that activates an SPS configuration. The method may include receiving, from the base station, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active.

Some aspects described herein relate to a method of wireless communication performed by a base station. The method may include transmitting, to a UE, DCI that activates an SPS configuration. The method may include transmitting, to the UE, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active.

Some aspects described herein relate to a non-transitory computer-readable medium that stores a set of instructions for wireless communication by a UE. The set of instructions, when executed by one or more processors of the UE, may cause the UE to receive, from a base station, DCI that activates an SPS configuration. The set of instructions, when executed by one or more processors of the UE, may cause the UE to receive, from the base station, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active.

Some aspects described herein relate to a non-transitory computer-readable medium that stores a set of instructions for wireless communication by a base station. The set of instructions, when executed by one or more processors of the base station, may cause the base station to transmit, to a UE, DCI that activates an SPS configuration. The set of instructions, when executed by one or more processors of the base station, may cause the base station to transmit, to the UE, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active.

Some aspects described herein relate to an apparatus for wireless communication. The apparatus may include means for receiving, from a base station, DCI that activates an SPS configuration. The apparatus may include means for receiving, from the base station, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active.

Some aspects described herein relate to an apparatus for wireless communication. The apparatus may include means for transmitting, to a UE, DCI that activates an SPS configuration. The apparatus may include means for transmitting, to the UE, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5 and 6 are diagrams illustrating example processes associated with beams for semi-persistent scheduling, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
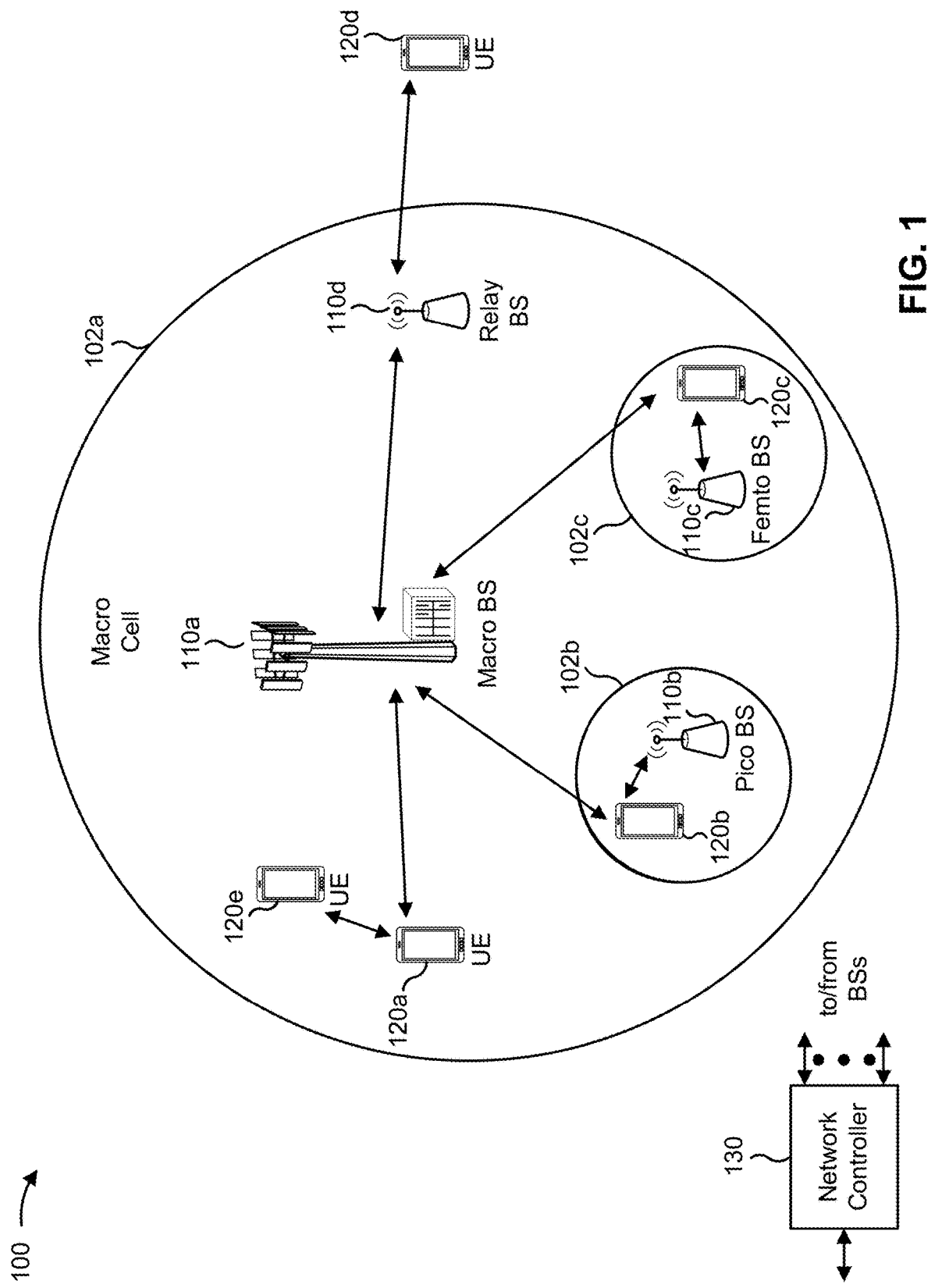
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
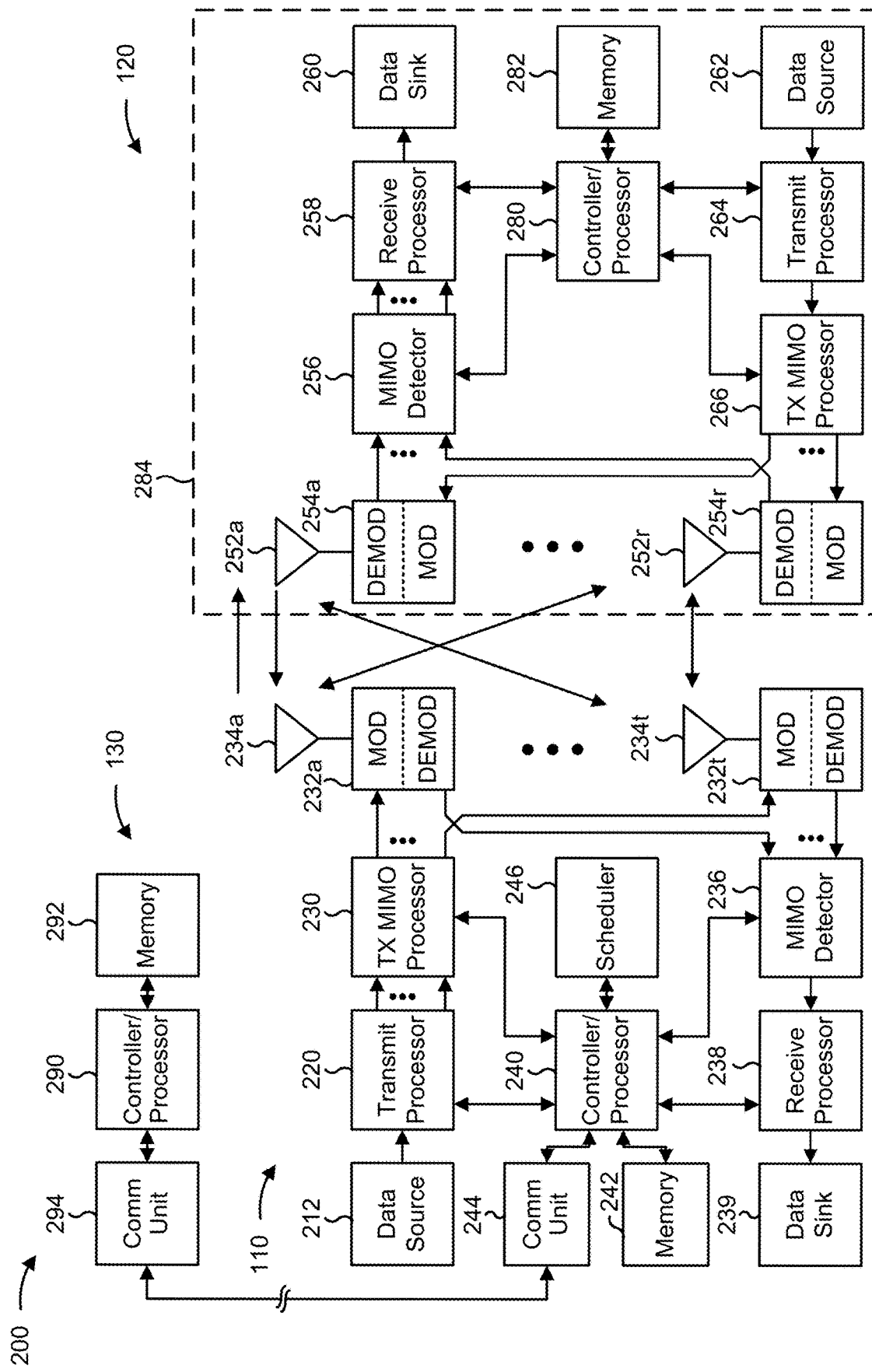
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4A-4F, 5, and 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4A-4F, 5, and 6).

Controller/processor 240 of base station 110, controller/processor 280 of UE 120, and/or any other component(s) of FIG. 2 may perform one or more techniques associated with beams for semi-persistent scheduling (SPS), as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving, from a base station, DCI that activates an SPS configuration; means for determining at least one beam, for a plurality of SPS occasions that are according to the SPS configuration activated by the DCI, based at least in part on a determination of: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active, means for receiving, from the base station, SPS transmissions in the plurality of SPS occasions based at least in part on the at least one beam that is determined, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, DCI that activates an SPS configuration, means for determining at least one beam, that the UE is to use for a plurality of SPS occasions that are according to the SPS configuration activated by the DCI, based at least in part on a determination of: whether a scheduling offset between the DCI and the plurality of SPS occasions satisfies a threshold time duration, whether a TCI state, associated with a CORESET that carries the DCI and is used to determine the at least one beam, changes while the SPS is active, or whether a mapping of a TCI identifier, indicated by the DCI, to one or more TCI states changes while the SPS is active, means for transmitting, to the UE, SPS transmissions in the plurality of SPS occasions based at least in part on the at least one beam that is determined, and/or the like.

In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
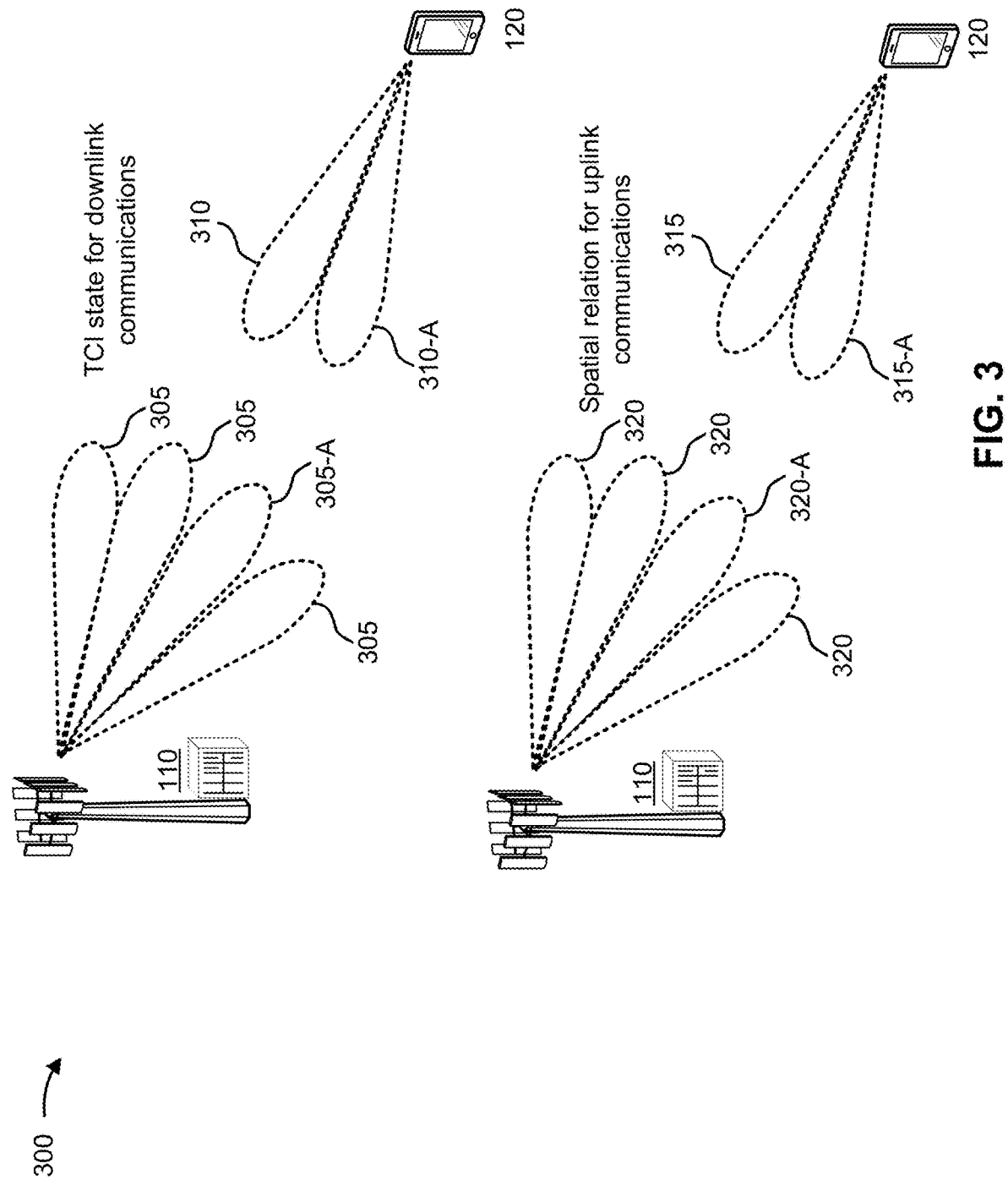
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a transmission configuration indication (TCI) state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

In some aspects, the base station 110 may activate (e.g., via a medium access control control element (MAC-CE)) a set of TCI states (e.g., up to 8 TCI states) for a PDSCH. In this case, a TCI field in downlink control information (DCI) may indicate a TCI state, of the set of TCI states, for a PDSCH scheduled by the DCI. The UE 120 may use the indicated TCI state to receive the PDSCH if the scheduling offset between reception of the DCI and the PDSCH scheduled by the DCI satisfies (e.g., is equal to or greater than) a threshold time duration (e.g., timeDurationForQCL, such as 14 or 28 OFDM symbols, and which may correspond to a capability of the UE 120).

In some cases, a TCI field is not present in the DCI. In such cases, a PDSCH scheduled by the DCI may follow the same TCI state as the TCI state of the CORESET in which the DCI is received. This technique may be used when the scheduling offset between reception of the DCI and the PDSCH scheduled by the DCI satisfies the threshold time duration, as described above. If the scheduling offset does not satisfy the threshold time duration, then the UE 120 may use a default QCL assumption (e.g., for QCL-TypeD). A default QCL assumption for the PDSCH may be associated with QCL information and/or a TCI state of a CORESET, associated with a monitored search space, that has a lowest CORESET identifier, in a latest slot in which one or more CORESETs (e.g., within an active bandwidth part of the serving cell) are monitored by the UE 120.

In some aspects, a TCI identifier (e.g., a TCI codepoint) that is indicated in DCI for a PDSCH may be mapped to one TCI state or may be mapped to two TCI states. A TCI identifier may be mapped to two TCI states for multi-TRP communication that uses a single DCI. In this case, a PDSCH may be associated with two TCI states that are used for communicating with two TRPs. For example, for communications using spatial division multiplexing (SDM), different sets of layers of the PDSCH may be associated with different TCI states. As another example, for communications using frequency division multiplexing (FDM), different sets of resource blocks may be associated with different TCI states. As a further example, for communications using time division multiplexing (TDM), different sets of OFDM symbols may be associated with different TCI states.

The base station 110 may transmit a MAC-CE to the UE 120 that indicates a mapping of TCI identifiers (e.g., TCI codepoints) to TCI states. In this case, DCI that schedules a PDSCH may indicate one of the mapped TCI identifiers for the PDSCH. If the indicated TCI identifier maps to two TCI states, then the PDSCH scheduled by the DCI may use SDM, FDM, or TDM (e.g., according to a radio resource control (RRC) configuration and/or other scheduling information in the DCI, such as a quantity of code-division multiplexing (CDM) groups associated with the scheduled antenna ports). This technique may be used when the scheduling offset between reception of the DCI and the PDSCH scheduled by the DCI satisfies the threshold time duration, as described above.

In some cases, the scheduling offset between reception of the DCI and the PDSCH scheduled by the DCI does not satisfy the threshold time duration. In this case, if at least one TCI identifier (e.g., TCI codepoint) maps to two TCI states, the UE 120 is capable of using two default QCL assumptions, and the UE 120 is configured to use two default TCI states (e.g., the UE 120 is configured with the RRC parameter enableTwoDefaultTCIStates), then default QCL assumptions for the PDSCH are TCI states mapped to the lowest TCI identifier of TCI identifiers that maps to two TCI states. That is, in this case, the default QCL assumption does not use the CORESET with the lowest CORESET identifier, as described above.

As indicated above, FIG. 3 is provided as an example. Other examples may differ from what is described with respect to FIG. 3.

SPS may be used to schedule a set of downlink transmissions, each downlink transmission corresponding to an SPS occasion of a set of SPS occasions, for a UE without requiring individual downlink grants (e.g., in DCI) for each downlink transmission, thereby conserving signaling overhead. In some aspects, a base station may transmit (e.g., via RRC signaling) information to the UE that identifies one or more parameters for an SPS configuration. The one or more parameters may include a periodicity for SPS occasions, a quantity of hybrid automatic repeat request (HARD) processes associated with the SPS configuration, and/or the like.

SPS PDSCHs in accordance with the SPS configuration may be activated by DCI scrambled by a configured scheduling radio network temporary identifier (CS-RNTI). The DCI also may indicate one or more transmission parameters for the activated SPS configuration. The one or more transmission parameters may include a resource allocation (e.g., time and/or frequency resources) that is to be used for each SPS occasion (e.g., each SPS PDSCH), a modulation and coding scheme (MCS), a transport block (TB) size, one or more TCI states, and/or the like.

Upon receiving the activation DCI, the UE may begin monitoring for SPS transmissions scheduled according to the SPS configuration. That is, after an SPS configuration is activated, the UE may receive SPS PDSCHs based at least in part on a periodicity associated with the SPS configuration. The UE may continue to monitor for SPS transmissions and/or receive SPS PDSCHs, according to the SPS configuration, until another DCI releases (e.g., deactivates) the SPS configuration.

However, in certain scenarios, the UE may not be enabled to determine one or more beams for receiving SPS transmissions associated with an active SPS configuration. For example, the UE may not be enabled to determine one or more beams for receiving SPS transmissions when a scheduling offset between the activation DCI and one or more SPS occasions does not satisfy a threshold time duration (e.g., when the scheduling offset is less than a timeDurationForQCL value). As another example, the UE may not be enabled to determine one or more beams for receiving SPS transmissions when a TCI field is not present in the activation DCI, and the TCI state associated with a CORESET that carries the DCI and is used to determine a beam changes while the SPS configuration is active. As a further example, the UE may not be enabled to determine one or more beams for receiving SPS transmissions when a TCI field is present in the activation DCI, and a mapping of TCI codepoints to TCI state(s) (e.g., as indicated in a MAC-CE) changes while the SPS configuration is active.

Some techniques and apparatuses described herein enable a UE to determine one or more beams for receiving SPS transmissions in one or more of the scenarios described above. In this way, a performance of the SPS transmissions may be improved.

Figure 4A:
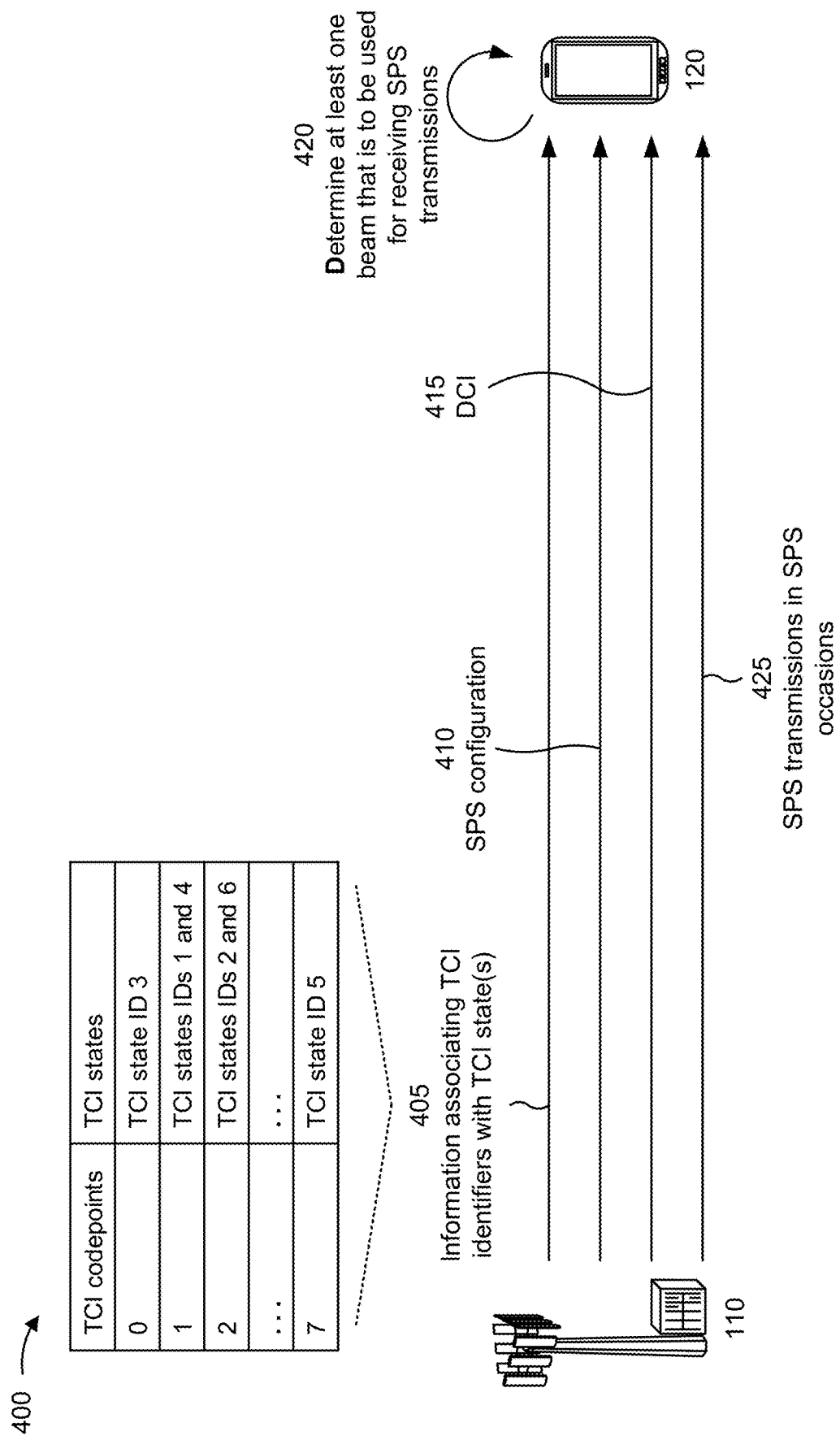
FIGS. 4A-4F are diagrams illustrating examples associated with beams for semi-persistent scheduling, in accordance with the present disclosure.

FIGS. 4A-4F are diagrams illustrating examples 400 of beams for SPS, in accordance with the present disclosure. As shown in FIG. 4A, a base station 110 and a UE 120 may communicate with one another. For example, the UE 120 may receive SPS transmissions from the base station 110 in accordance with an SPS configuration, as described below.

In some aspects, the UE 120 may receive the SPS transmissions from at least a first TRP and a second TRP. In some aspects, the first TRP and the second TRP may be associated with the base station 110. In some aspects, the first TRP and the second TRP may be associated with different base stations 110.

As shown in FIG. 4A, and by reference number 405, the base station 110 may transmit, and the UE 120 may receive, information that associates TCI identifiers (e.g., TCI codepoints) with TCI state(s). The base station 110 may transmit the information via a MAC-CE. The information may identify a mapping of TCI identifiers to TCI state(s). In this case, a TCI identifier may map to one TCI state or a plurality of (e.g., two) TCI states.

As shown by reference number 410, the base station 110 may transmit, and the UE 120 may receive, an SPS configuration. For example, the base station 110 may transmit the SPS configuration via RRC signaling. In some aspects, the SPS configuration may indicate time domain information for a set of SPS transmissions. For example, the time domain information may include a periodicity for SPS transmissions, a time offset for SPS transmissions, and/or the like. The SPS configuration may also indicate one or more additional parameters for the SPS transmissions, such as a quantity of associated HARQ processes, as described above.

As shown by reference number 415, the base station 110 may transmit, and the UE 120 may receive, DCI. The UE 120 may receive the DCI in a CORESET associated with a search space monitored by the UE 120. The CORESET may be associated with a TCI state (e.g., according to a CORESET configuration provided to the UE 120).

The DCI may indicate that the SPS configuration is to be activated. In some aspects, the DCI may include a TCI field, and the TCI field may include a TCI identifier (e.g., a TCI codepoint) that corresponds to one or more TCI states in accordance with the mapping of TCI identifiers to TCI state(s). In some aspects, the DCI may not include a TCI field.

The DCI may also indicate a resource allocation (e.g., time and/or frequency resources) for the set of SPS transmissions. In other words, each SPS transmission, of the set of SPS transmissions, may be received by the UE 120 in an SPS occasion indicated by the resource allocation, and according to the periodicity indicated by the SPS configuration. A time duration between a first symbol of an SPS occasion and a last symbol in which the DCI is received may be referred to as a scheduling offset. In some aspects, a scheduling offset between the DCI and one or more SPS occasions may satisfy a threshold time duration (e.g., timeDurationForQCL). In some aspects, a scheduling offset between the DCI and one or more SPS occasions may not satisfy the threshold time duration (e.g., timeDurationForQCL).

As shown by reference number 420, the UE 120 may determine at least one beam that is to be used for receiving the SPS transmissions in the SPS occasions. In some aspects, the UE 120 may determine the at least one beam based at least in part on a determination of whether a scheduling offset between the DCI and the SPS occasions satisfies the threshold time duration, as described below. In some aspects, such as when the TCI field is not present in the DCI, the UE 120 may determine the at least one beam based at least in part on a determination of whether a TCI state, associated with a CORESET used to determine a beam (e.g., the CORESET in which the DCI is received), changes while the SPS configuration is active, as described below. In some aspects, such as when the TCI field is present in the DCI, the UE 120 may determine the at least one beam based at least in part on a determination of whether a mapping of a TCI identifier, indicated by the DCI, to one or more TCI states changes while the SPS configuration is active, as described below. The base station 110 may determine the at least one beam that the UE 120 is to use for receiving the SPS transmissions in the SPS occasions in a similar manner as the UE 120.

As shown by reference number 425, the base station 110 may transmit, and the UE 120 may receive, SPS transmissions in the SPS occasions in accordance with the SPS configuration and the DCI that activated the SPS configuration. The UE 120 may receive the SPS transmissions using the at least one beam determined by the UE 120, as described in more detail below (e.g., the base station 110 may transmit the SPS transmissions using the at least one beam). In some aspects, the UE 120 may receive SPS transmissions, in an SPS occasion, from at least a first TRP and a second TRP (e.g., co-located at the base station 110 or not co-located at the base station 110). In this case, an SPS occasion may include two (or more) transmission occasions (e.g., repetitions) based at least in part on a multiplexing scheme, such as an SDM scheme, an FDM scheme, or a TDM scheme.

Figure 4B:
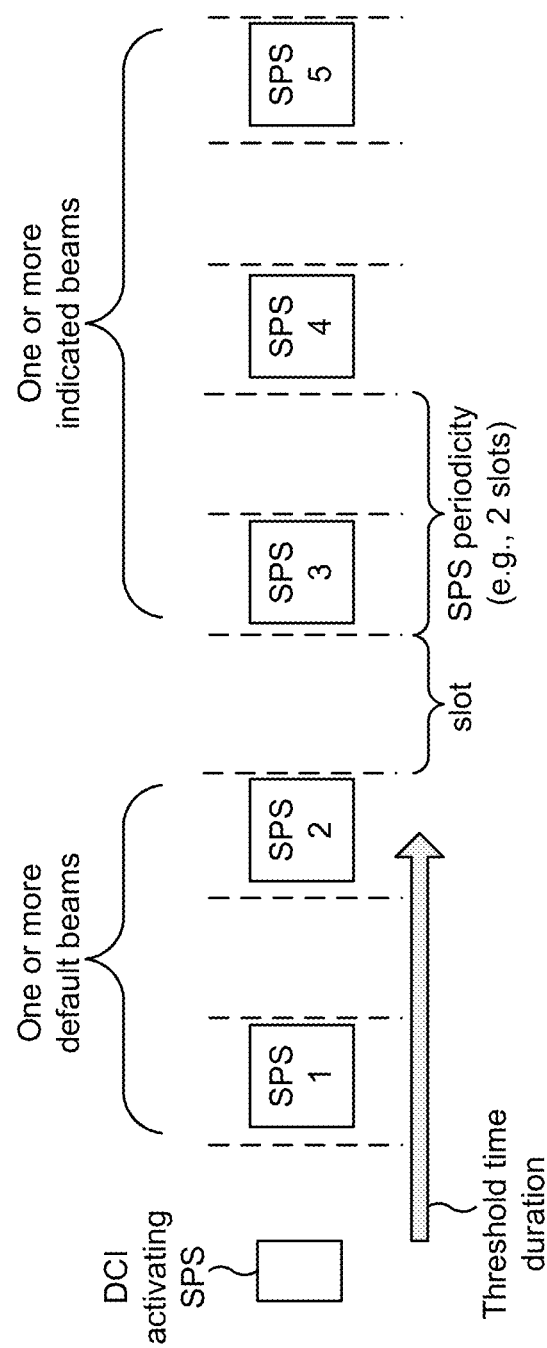

FIG. 4B shows an example of the UE 120 determining the at least one beam that is to be used for receiving the SPS transmissions in the SPS occasions. FIG. 4B shows a set of SPS transmissions (e.g., SPS PDSCHs) in a set of SPS occasions.

As shown in FIG. 4B, the scheduling offset between the DCI and one or more first SPS occasions (e.g., SPS 1 and SPS 2, as shown) may not satisfy the threshold time duration. In other words, the one or more first SPS occasions may occur before an end of the threshold time duration, which starts from an end of the DCI (e.g., the SPS occasions start earlier than the timeDurationForQCL symbols that are after the last symbol of the DCI that activated the SPS configuration). In some aspects, the UE 120 may determine that one or more default beams are to be used for receiving SPS transmissions in the one or more first SPS occasions based at least in part on a determination that the scheduling offset between the DCI and the one or more first SPS occasions does not satisfy the threshold time duration.

In some aspects, the UE 120 may use a single default beam to receive SPS transmissions in the one or more first SPS occasions. The single default beam may be associated with a single default TCI state that is based at least in part on a QCL assumption associated with a CORESET having a lowest CORESET identifier of CORESETs monitored by the UE in a latest slot. With reference to an SPS occasion in a slot, "latest" slot may refer to the slot or a slot before (e.g., immediately before or not immediately before) the slot in which one or more CORESETs are monitored by the UE 120. In some aspects, the UE 120 may determine that the single default beam is to be used for receiving SPS transmissions in the one or more first SPS occasions when the mapping of TCI identifiers to TCI state(s) does not include a TCI identifier mapped to a plurality of (e.g., two) TCI states and/or the UE 120 is not configured to use a plurality of (e.g., two) default TCI states/a plurality of (e.g., two) default beams (e.g., the UE 120 is not configured with the RRC parameter enableTwoDefaultTCIStates).

In some aspects, the UE 120 may use a plurality of (e.g., two) default beams to receive SPS transmissions in the one or more first SPS occasions. The plurality of default beams may be associated with a plurality of (e.g., two) default TCI states that are associated with a lowest TCI identifier (e.g., a lowest TCI codepoint) of TCI identifiers that map to a plurality of (e.g., two) different TCI states. In some aspects, the UE 120 may determine that the plurality of default beams are to be used for receiving SPS transmissions in the one or more first SPS occasions when at least one TCI identifier is mapped to a plurality of (e.g., two) TCI states and/or the UE 120 is configured to use a plurality of default TCI states/a plurality of default beams (e.g., the UE 120 is configured with the RRC parameter enableTwoDefaultT-CIStates). The UE 120 may use the plurality of default beams for receiving SPS transmissions in connection with a single-DCI, multi-TRP scheme (e.g., an SDM, FDM, or TDM scheme).

As shown in FIG. 4B, the scheduling offset between the DCI and one or more second SPS occasions (e.g., SPS 3, SPS 4, and SPS 5, as shown) may satisfy the threshold time duration. In other words, the one or more second SPS occasions may occur after the threshold time duration, which starts from an end of the DCI (e.g., the SPS occasions start later than the timeDurationForQCL symbols that are after the last symbol of the DCI that activated the SPS configuration). In some aspects, the UE 120 may determine that one or more indicated beams are to be used for receiving SPS transmissions in the one or more second SPS occasions based at least in part on a determination that the scheduling offset between the DCI and the one or more second SPS occasions satisfies the threshold time duration.

In some aspects, the UE 120 may use a single indicated beam to receive SPS transmissions in the one or more second SPS occasions. In some aspects, the single indicated beam may be associated with a single TCI state that is associated with a TCI identifier indicated in the DCI (e.g., when the indicated TCI identifier maps to one TCI state). In some aspects, the single indicated beam may be associated with a single TCI state that is associated with the CORESET in which the DCI is received (e.g., when the TCI field is not present in the DCI).

In some aspects, the UE 120 may use a plurality of (e.g., two) indicated beams to receive SPS transmissions in the one or more second SPS occasions. The plurality of indicated beams may be associated with a plurality of (e.g., two) TCI states that are mapped to a TCI identifier indicated in the DCI. In some aspects, the UE 120 may determine that the plurality of indicated beams is to be used for receiving SPS transmissions in the one or more second SPS occasions when a TCI identifier indicated in the DCI maps to a plurality of (e.g., two) TCI states. The UE 120 may use the plurality of indicated beams for receiving SPS transmissions in connection with a single-DCI, multi-TRP scheme (e.g., an SDM, FDM, or TDM scheme).

Figure 4C:
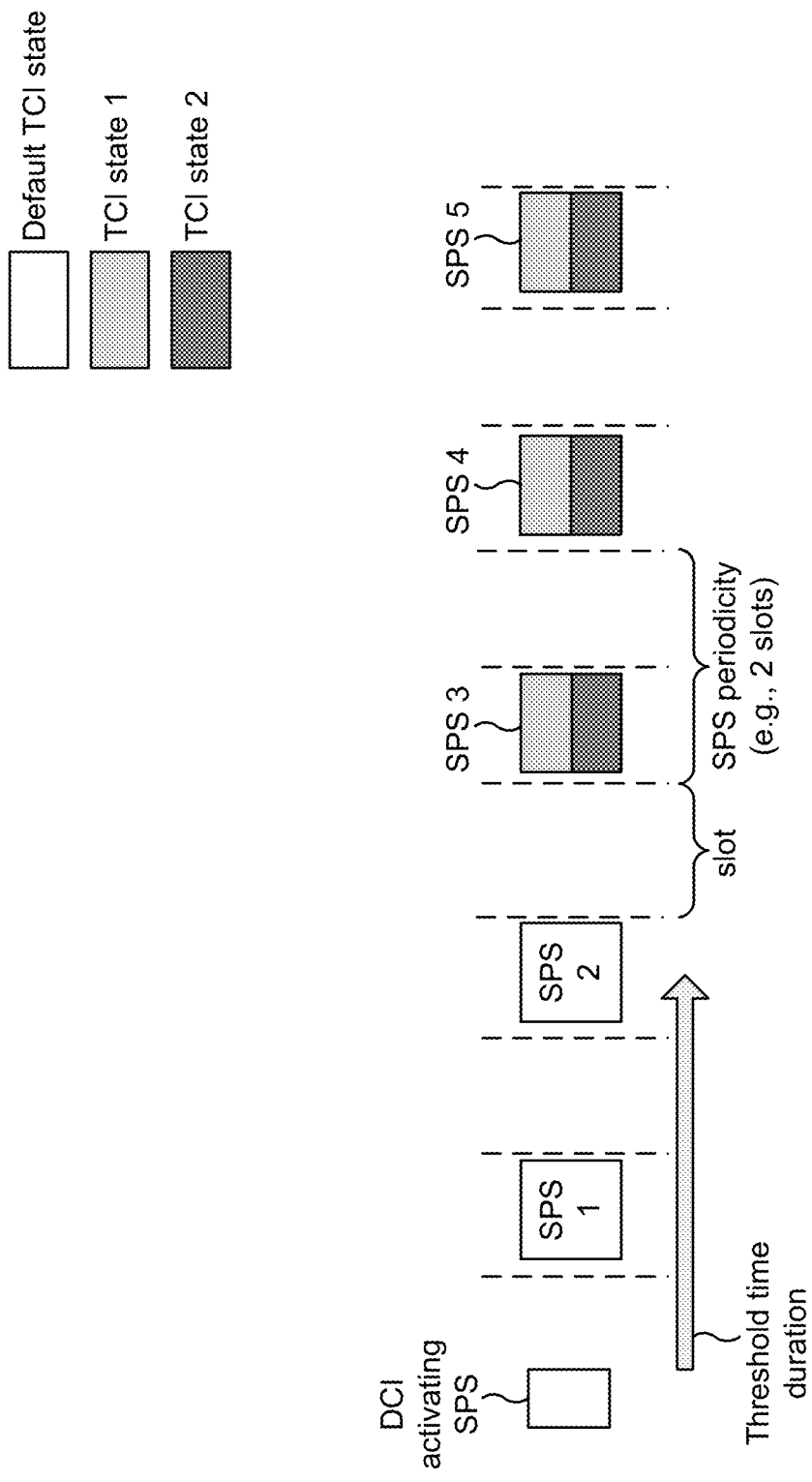

As shown in FIG. 4C, in some cases, the techniques described above in FIG. 4B may result in the UE 120 using a single TCI state for SPS transmissions in the one or more first SPS occasions (e.g., SPS 1 and SPS 2, as shown), and a plurality of TCI states for SPS transmissions in the one or more second SPS occasions (e.g., SPS 3, SPS 4, and SPS 5, as shown). For example, this may occur when the UE 120 is not configured to use a plurality of default TCI states (e.g., the UE 120 is not configured with the RRC parameter enableTwoDefaultTCIStates), but the DCI indicates a TCI identifier that maps to a plurality of TCI states.

For example, if the UE 120 is RRC-configured with the parameter repetitionSchemeConfig-r16 set to FDMSchemeB, the one or more first SPS occasions (e.g., occurring earlier than the end of the threshold time duration) may be associated with a single TCI state, and the one or more second SPS occasions may be associated with a plurality of TCI states. Accordingly, the one or more second SPS occasions may each include two (or more) transmission occasions in accordance with FDMSchemeB (e.g., a first resource block set in an SPS occasion may use a first of two TCI states, and a second resource block set in the SPS occasion may use a second of two TCI states). In this case, TB sizes for SPS transmissions in the one or more first SPS occasions may be different from TB sizes for SPS transmissions in the one or more second SPS occasions (e.g., because TB size is based at least in part on the first resource block set in FDMSchemeB).

Figure 4D:
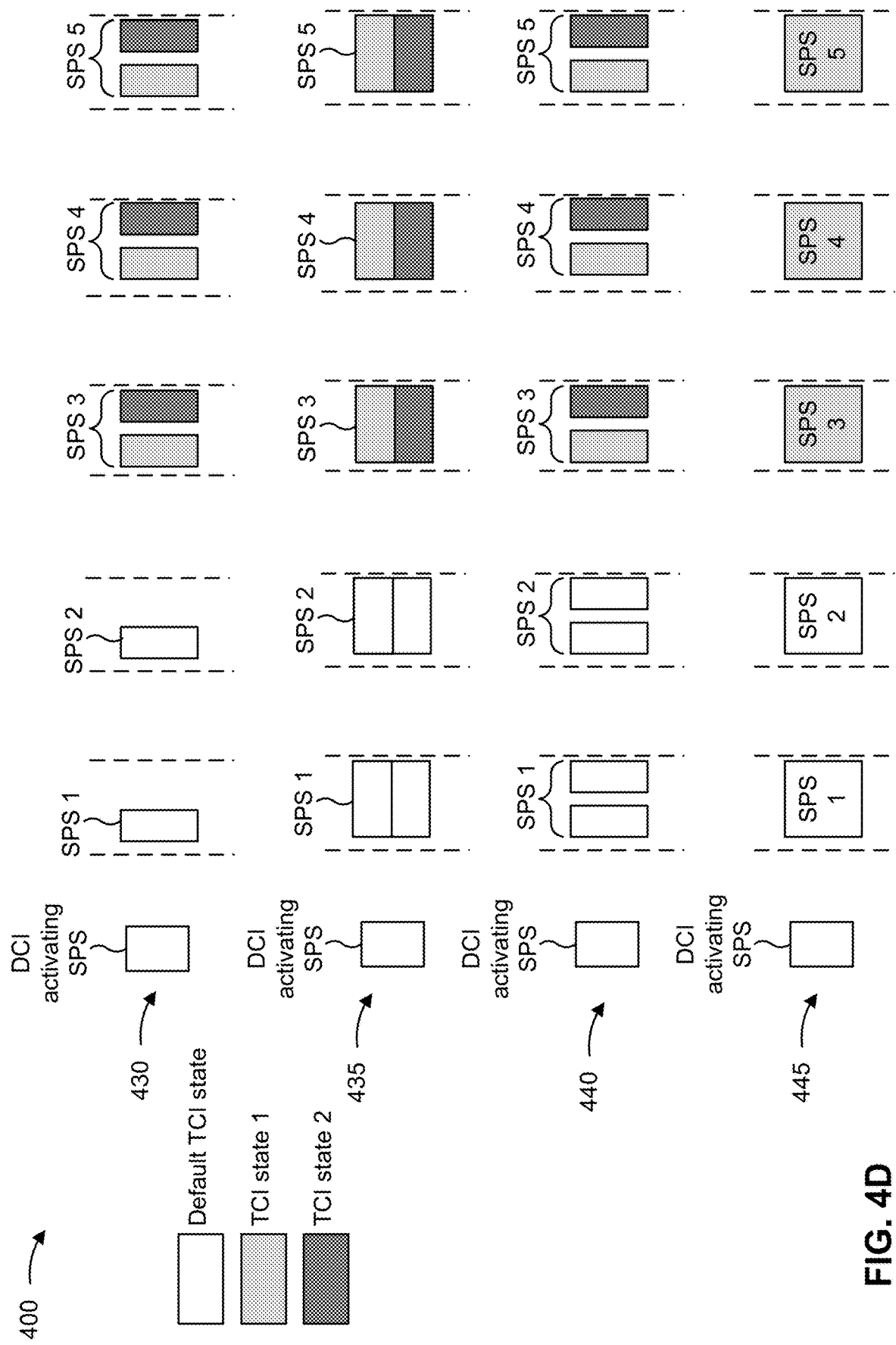

As shown in FIG. 4D, and by reference number 430, in some aspects, a rule may indicate that the behavior described above in FIG. 4C is permitted. That is, the one or more first SPS occasions (e.g., occurring earlier than the end of the threshold time duration) may be associated with a single TCI state, and the one or more second SPS occasions (e.g., occurring after the threshold time duration) may be associated with a plurality of (e.g., two) TCI states. Alternatively, in some aspects, the scheduling offset between the DCI and the SPS occasions must satisfy the threshold time duration, for example, based at least in part on a rule that indicates that the scheduling offset between the DCI and the SPS occasions is to satisfy the threshold time duration. Thus, the base station 110 may transmit the DCI only in symbols that allow for the scheduling offset to satisfy the threshold time duration.

As shown by reference numbers 435 and 440, in some aspects, the one or more first SPS occasions each include a same quantity of transmission occasions (e.g., repetitions) as a quantity of transmission occasions included in the one or more second SPS occasions, for example, based at least in part on a rule that indicates that the quantity of transmissions occasions in each SPS occasions is to be the same. In other words, the one or more first SPS occasions are to follow the same PDSCH scheme (e.g., an SDM, FDM, or TDM scheme) as the one or more second SPS occasions (e.g., with regard to a quantity of transmission occasions/repetitions). In this case, the one or more first SPS occasions may include two (or more) transmission occasions that both use the same TCI state (e.g., the single default TCI state). Reference number 435 illustrates this technique for an FDM scheme (e.g., repetitionSchemeConfig-r16 is set to FDMSchemeB), and reference number 440 illustrates this technique for a TDM scheme (e.g., repetitionSchemeConfig-r16 set to TDMSchemeA).

As shown by reference number 445, in some aspects, SPS transmissions in the one or more second SPS occasions are to use only one of a plurality of (e.g., two) TCI states indicated for the SPS occasions in the DCI. For example, the DCI may indicate a TCI identifier that maps to a plurality of (e.g., two) TCI states, and only the first of the plurality of TCI states (e.g., rather than all of the plurality of TCI states) is to be used for the SPS transmissions in the one or more second SPS occasions. Thus, if the one or more second SPS occasions each include two (or more) transmission occasions, then only one of the two transmission occasions will be used for an SPS transmission.

Figure 4E:
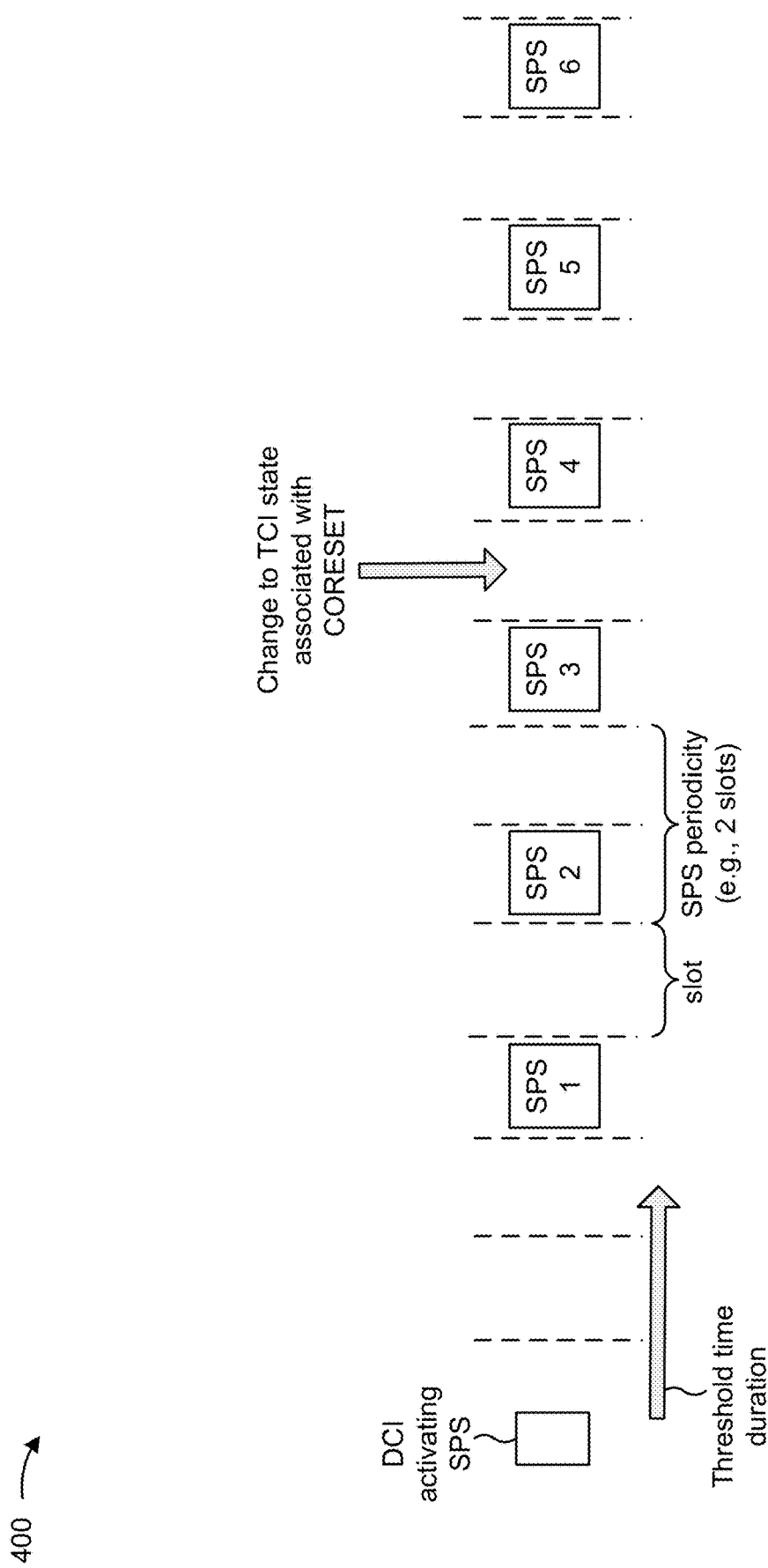

FIG. 4E shows an example of the UE 120 determining the at least one beam that is to be used for receiving the SPS transmissions in the SPS occasions. FIG. 4E shows a set of SPS transmissions (e.g., SPS PDSCHs) in a set of SPS occasions.

As described above, if a TCI field is not present in the DCI, then the SPS transmissions may use a TCI state that corresponds to the TCI state (e.g., the active TCI state)

associated with the CORESET in which the DCI is received (which may be referred to as the scheduling CORESET). As shown in FIG. 4E, in some aspects, the TCI state (e.g., the active TCI state) associated with the scheduling CORESET may change while the SPS configuration is active. The TCI state associated with the scheduling CORESET prior to the change may be referred to as an original TCI state (e.g., a first TCI state), and the TCI state associated with the scheduling CORESET after the change may be referred to as the new TCI state (e.g., a second TCI state).

In some aspects, the change to the TCI state may be associated with a time when a command to change the TCI state is applied at the UE 120. The base station 110 may indicate (e.g., command) a change to the active TCI state of the scheduling CORESET via RRC signaling or a PDCCH TCI state activation MAC-CE (which is different from a PDSCH TCI state activation MAC-CE). In the case of the PDCCH TCI state activation MAC-CE, the UE 120 may apply the command to change the active TCI state after a time window. For example, the UE 120 may apply the command 3 milliseconds (ms) after the UE 120 transmits acknowledgment (ACK) feedback (e.g., HARQ-ACK) for the PDSCH that carried the MAC-CE.

In some aspects, one or more first SPS occasions (e.g., SPS 1, SPS 2, and SPS 3, as shown) may occur before the change to the TCI state associated with the scheduling CORESET, and one or more second SPS occasions (e.g., SPS 4, SPS 5, and SPS 6, as shown) may occur after the change to the TCI state associated with the scheduling CORESET. In some aspects, SPS transmissions in the one or more first SPS occasions may use a first beam associated with the original TCI state, and SPS transmissions in the one or more second SPS occasions may use a second beam associated with the new TCI state (e.g., SPS transmissions after the change follow the new TCI state). In some aspects, SPS transmissions in the one or more first SPS occasions and in the one or more second SPS occasions may use a beam associated with the original TCI state (e.g., SPS transmissions after the change continue to use the original TCI state of the CORESET at the time when the DCI activating the SPS configuration is received).

In some aspects, the base station 110 and/or the UE 120 may deactivate (e.g., release) the SPS configuration based at least in part on a determination that there is a change to the TCI state associated with the CORESET to a new TCI state (e.g., a different TCI state) while the SPS configuration is active. For example, the base station 110 may transmit new DCI that indicates that the SPS configuration is to be deactivated.

In some aspects, the base station 110 and/or the UE 120 may determine an error case (e.g., determine that an error exists) based at least in part on a determination that there is a change to the TCI state associated with the CORESET to a new TCI state while the SPS configuration is active. That is, the UE 120 does not expect there to be a change to the TCI state associated with the CORESET to a new TCI state while the SPS configuration is active, thereby indicating an error case.

Figure 4F:
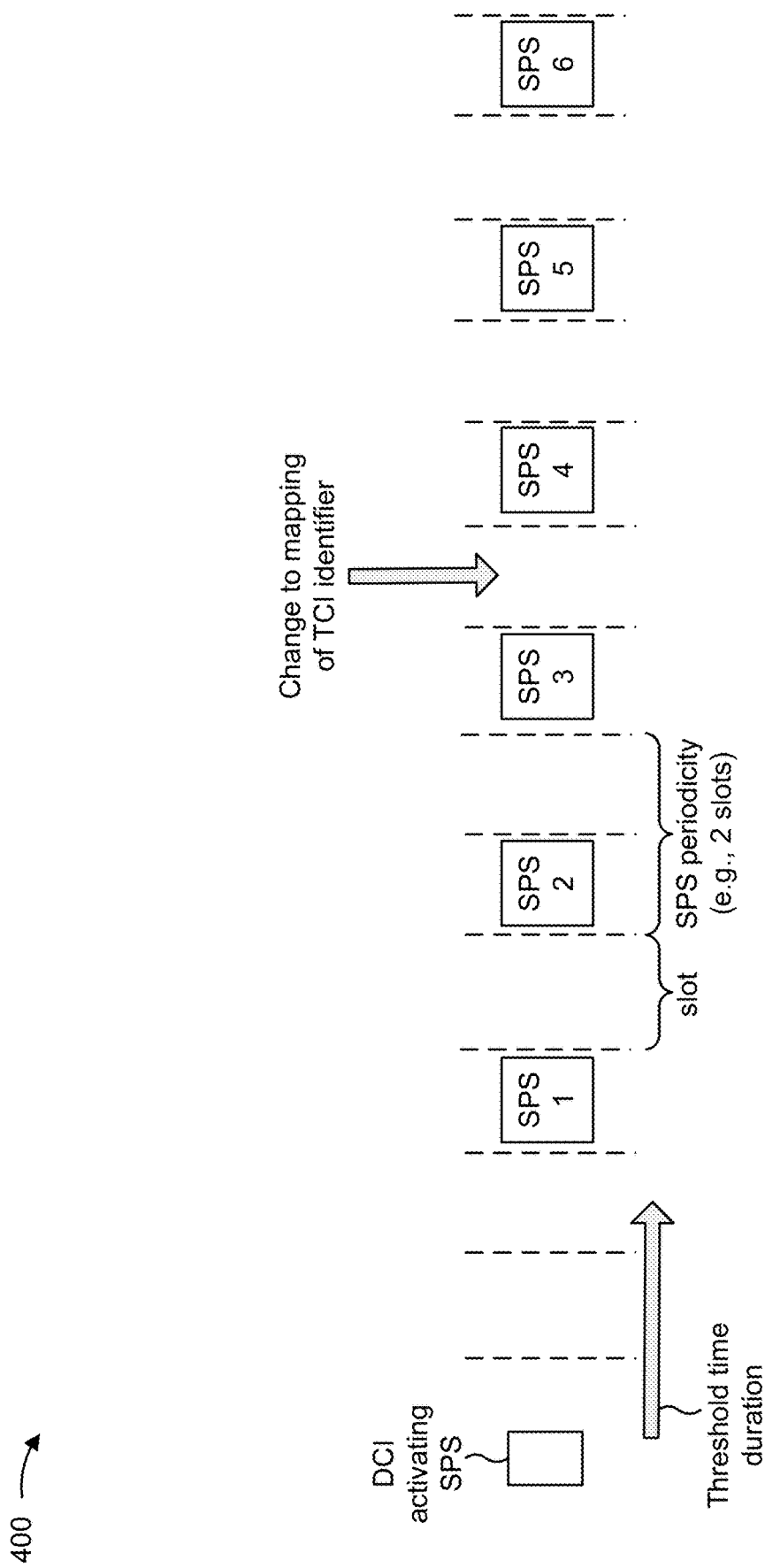

FIG. 4F shows an example of the UE 120 determining the at least one beam that is to be used for receiving the SPS transmissions in the SPS occasions. FIG. 4F shows a set of SPS transmissions (e.g., SPS PDSCHs) in a set of SPS occasions.

As described above, if a TCI field is present in the DCI, then the TCI field may include a TCI identifier (e.g., a TCI codepoint) that is mapped to one or more TCI states. As shown in FIG. 4F, in some aspects, a mapping of the TCI identifier to the one or more TCI states may change while the SPS configuration is active. For example, the base station 110 may transmit to the UE 120 a PDSCH TCI state activation MAC-CE that maps the TCI identifier to one or more different TCI states. The mapping of the TCI identifier to the one or more TCI states prior to the change may be referred to as an original mapping (e.g., a first mapping), and the mapping of the TCI identifier to the one or more different TCI states after the change may be referred to as a new mapping (e.g., a second mapping). In some aspects, the change to the mapping may be associated with a time when a command to change the mapping is applied at the UE 120, as described above.

In some aspects, one or more first SPS occasions (e.g., SPS 1, SPS 2, and SPS 3, as shown) may occur before the change to the mapping, and one or more second SPS occasions (e.g., SPS 4, SPS 5, and SPS 6, as shown) may occur after the change to the mapping. In some aspects, SPS transmissions in the one or more first SPS occasions may use a first beam associated with the one or more TCI states of the original mapping, and SPS transmissions in the one or more second SPS occasions may use a second beam associated with the one or more different TCI states of the new mapping (e.g., SPS transmissions after the change follow the different TCI states of the new mapping, which may be referred to as Technique 1). In some aspects, SPS transmissions in the one or more first SPS occasions and in the one or more second SPS occasions may use a beam associated with the one or more TCI states of the original mapping (e.g., SPS transmissions after the change continue to use the one or more TCI states of the original mapping at the time when the DCI activating the SPS configuration is received, which may be referred to as Technique 2).

In some aspects, the base station 110 and/or the UE 120 may deactivate (e.g., release) the SPS configuration based at least in part on a determination that there is a change to the mapping to a new mapping (e.g., a different mapping) of the TCI identifier to one or more different TCI states while the SPS configuration is active (which may be referred to as Technique 3). That is, the TCI indicator identified in the DCI is mapped to one or more first TCI states when the DCI is received, and is changed (e.g., via a MAC-CE) to be mapped to one or more second TCI states thereafter. For example, the base station 110 may transmit new DCI that indicates that the SPS configuration is to be deactivated.

In some aspects, the base station 110 and/or the UE 120 may determine an error case (e.g., determine that an error exists) based at least in part on a determination that there is a change to the mapping to a new mapping of the TCI identifier to one or more different TCI states while the SPS configuration is active (which may be referred to as Technique 4). That is, the UE 120 does not expect there to be a change to the mapping while the SPS configuration is active, thereby indicating an error case.

In some aspects, the original mapping may map the TCI identifier to a first TCI state, and the new mapping may map the TCI identifier to a second TCI state (which may be referred to as Case 1). In some aspects, the original mapping may map the TCI identifier to a first pair of TCI states, and the new mapping may map the TCI identifier to a second pair of TCI states (which may be referred to as Case 2). In some aspects, the original mapping may map the TCI identifier to a single TCI state, and the new mapping may map the TCI identifier to a pair of TCI states (which may be referred to as Case 3). In some aspects, the original mapping may map the TCI identifier to a pair of TCI states, and the new mapping may map the TCI identifier to a single TCI state (which may be referred to as Case 4).

In some aspects, the UE 120 may determine the at least one beam that is to be used for receiving the SPS transmissions in the SPS occasions based at least in part on whether a quantity of the one or more TCI states of the original mapping is the same as a quantity of the one or more TCI states of the new mapping. For example, the UE 120 may use one of Techniques 1-4 for one of Cases 1-4, and may use another of Techniques 1-4 for another of Cases 1-4. As an example, in Case 3 or Case 4, the UE 120 may determine that Technique 2 is to be used. If Technique 1 was to be used in Case 3 or Case 4, then the PDSCH scheme (e.g., an SDM, a FDM, or a TDM scheme) and/or the quantity of transmission occasions (e.g., repetitions) for the SPS transmissions may be different before and after the change to the mapping. In some aspects, the UE 120 may be configured, or otherwise provisioned, with one or more rules that are used to determine a particular Technique that is to be used for a particular Case.

In this way, the UE 120 may determine one or more beams for receiving SPS transmissions, thereby improving a performance of the SPS transmissions.

As indicated above, FIGS. 4A-4F are provided as examples. Other examples may differ from what is described with respect to FIGS. 4A-4F.

Figure 5:
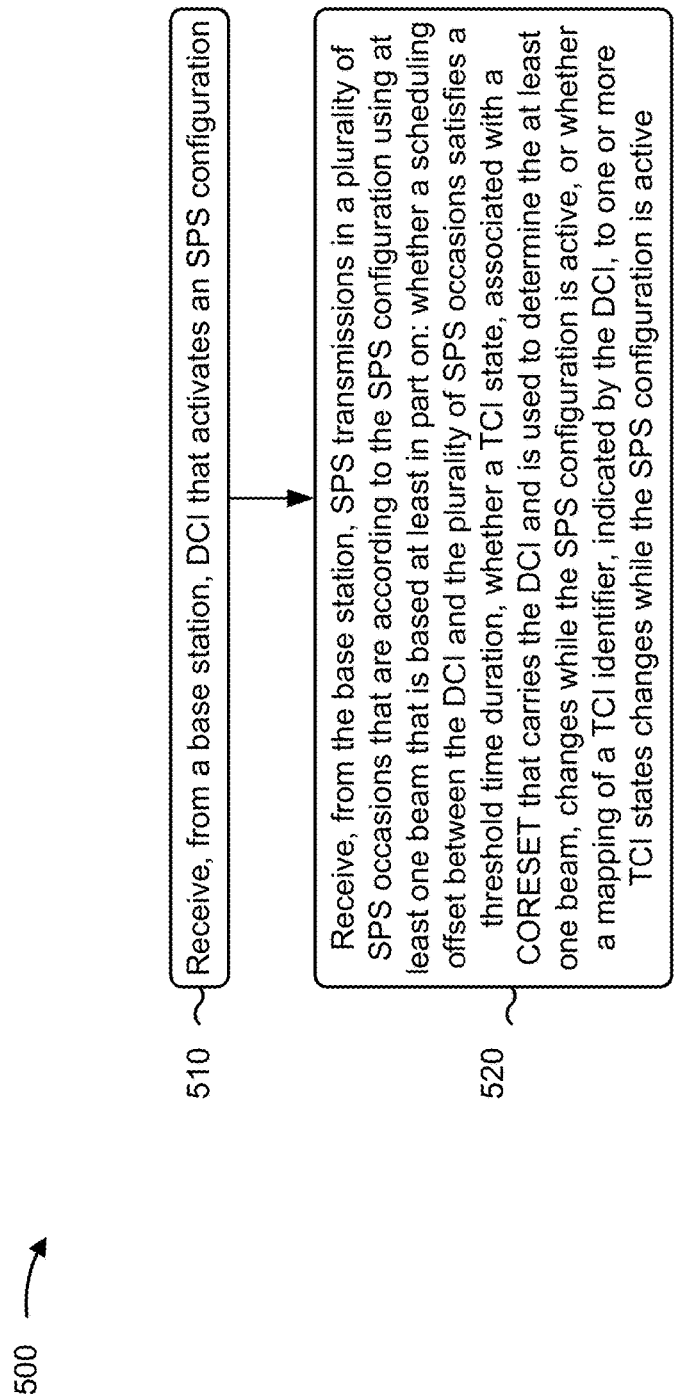

FIG. 5 is a diagram illustrating an example process 500 performed, for example, by a UE, in accordance with the present disclosure. Example process 500 is an example where the UE (e.g., UE 120 and/or the like) performs operations associated with beams for SPS.

As shown in FIG. 5, in some aspects, process 500 may include receiving, from a base station, DCI that activates an SPS configuration (block 510). For example, the UE (e.g., using antenna 252, DEMOD 254, MIMO detector 256, receive processor 258, controller/processor 280, and/or memory 282) may receive, from a base station, DCI that activates an SPS configuration, as described above.

As further shown in FIG. 5, in some aspects, process 500 may include receiving, from the base station, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active (block 520). For example, the UE (e.g., using antenna 252, DEMOD 254, MIMO detector 256, receive processor 258, controller/processor 280, and/or memory 282) may receive, from the base station, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active, as described above.

Process 500 may include additional aspects, such as any single aspect or any combination of aspects described below and/or in connection with one or more other processes described elsewhere herein.

In a first aspect, at least one default beam is for an SPS occasion, of the plurality of SPS occasions, based at least in part on a determination that the scheduling offset between the DCI and the SPS occasion does not satisfy the threshold time duration.

In a second aspect, alone or in combination with the first aspect, the at least one default beam is associated with a single default TCI state or a plurality of default TCI states based at least in part on at least one of: whether the UE is configured with at least one TCI identifier that is mapped to a plurality of TCI states, or whether the UE is configured to enable a plurality of default beams.

In a third aspect, alone or in combination with one or more of the first and second aspects, the at least one default beam is associated with a single default TCI state that is based at least in part on a quasi-co-location assumption associated with a CORESET associated with a lowest CORESET identifier of CORESETs monitored by the UE in a latest slot.

In a fourth aspect, alone or in combination with one or more of the first through third aspects, the at least one default beam is associated with a plurality of default TCI states that are associated with a lowest TCI identifier of TCI identifiers that map to a plurality of TCI states.

In a fifth aspect, alone or in combination with one or more of the first through fourth aspects, at least one indicated beam is for an SPS occasion, of the plurality of SPS occasions, based at least in part on a determination that the scheduling offset between the DCI and the SPS occasion satisfies the threshold time duration.

In a sixth aspect, alone or in combination with one or more of the first through fifth aspects, the at least one indicated beam is associated with a single TCI state that is associated with a TCI identifier indicated in the DCI, or that is associated with a CORESET in which the DCI is received.

In a seventh aspect, alone or in combination with one or more of the first through sixth aspects, the at least one indicated beam is associated with a plurality of TCI states that are associated with a TCI identifier indicated in the DCI.

In an eighth aspect, alone or in combination with one or more of the first through seventh aspects, one or more first SPS occasions, of the plurality of SPS occasions, before an end of the threshold time duration are associated with a single TCI state, and one or more second SPS occasions, of the plurality of SPS occasions, after the threshold time duration are associated with a plurality of TCI states.

In a ninth aspect, alone or in combination with one or more of the first through eighth aspects, the scheduling offset between the DCI and the plurality of SPS occasions satisfies the threshold time duration based at least in part on a rule that indicates that the scheduling offset between the DCI and the plurality of SPS occasions is to satisfy the threshold time duration.

In a tenth aspect, alone or in combination with one or more of the first through ninth aspects, one or more first SPS occasions, of the plurality of SPS occasions, before an end of the threshold time duration include a same quantity of transmission occasions as a quantity of transmission occasions included in one or more second SPS occasions, of the plurality of SPS occasions, after the threshold time duration.

In an eleventh aspect, alone or in combination with one or more of the first through tenth aspects, one or more SPS occasions, of the plurality of SPS occasions, after the threshold time duration are to use only one of a plurality of TCI states indicated for the plurality of SPS occasions.

In a twelfth aspect, alone or in combination with one or more of the first through eleventh aspects, a TCI field is not present in the DCI, the TCI state associated with the CORESET is an original TCI state, and there is a change to the TCI state associated with the CORESET to a new TCI state while the SPS configuration is active.

In a thirteenth aspect, alone or in combination with one or more of the first through twelfth aspects, the at least one beam for an SPS occasion, of the plurality of SPS occasions, after the change is based at least in part on the new TCI state.

In a fourteenth aspect, alone or in combination with one or more of the first through thirteenth aspects, the at least one beam for an SPS occasion, of the plurality of SPS occasions, after the change is based at least in part on the original TCI state.

In a fifteenth aspect, alone or in combination with one or more of the first through fourteenth aspects, process 500 includes deactivating the SPS configuration based at least in part on a determination that there is a change to the TCI state associated with the CORESET to a new TCI state while the SPS configuration is active.

In a sixteenth aspect, alone or in combination with one or more of the first through fifteenth aspects, process 500 includes determining that an error exists when there is a change to the TCI state associated with the CORESET to a new TCI state while the SPS configuration is active.

In a seventeenth aspect, alone or in combination with one or more of the first through sixteenth aspects, the mapping of the TCI identifier to the one or more TCI states is an original mapping, and there is a change to the mapping to a new mapping of the TCI identifier to one or more different TCI states while the SPS configuration is active.

In an eighteenth aspect, alone or in combination with one or more of the first through seventeenth aspects, the at least one beam for an SPS occasion, of the plurality of SPS occasions, after the change is based at least in part on whether a quantity of the one or more TCI states is the same as a quantity of the one or more different TCI states.

In a nineteenth aspect, alone or in combination with one or more of the first through eighteenth aspects, the at least one beam for an SPS occasion, of the plurality of SPS occasions, after the change is based at least in part on the one or more different TCI states of the new mapping.

In a twentieth aspect, alone or in combination with one or more of the first through nineteenth aspects, the at least one beam for an SPS occasion, of the plurality of SPS occasions, after the change is based at least in part on the one or more TCI states of the original mapping.

In a twenty-first aspect, alone or in combination with one or more of the first through twentieth aspects, process 500 includes deactivating the SPS configuration based at least in part on a determination that there is a change to the mapping to a new mapping of the TCI identifier to one or more different TCI states while the SPS configuration is active.

In a twenty-second aspect, alone or in combination with one or more of the first through twenty-first aspects, process 500 includes determining that an error exists when there is a change to the mapping to a new mapping of the TCI identifier to one or more different TCI states while the SPS configuration is active.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with the present disclosure. Example process 600 is an example where the base station (e.g., base station 110 and/or the like) performs operations associated with beams for SPS.

As shown in FIG. 6, in some aspects, process 600 may include transmitting, to a UE, DCI that activates an SPS configuration (block 610). For example, the base station (e.g., using transmit processor 220, TX MIMO processor 230, modulator 232, antenna 234, controller/processor 240, memory 242, and/or scheduler 246) may transmit, to a UE, DCI that activates an SPS configuration, as described above.

As further shown in FIG. 6, in some aspects, process 600 may include transmitting, to the UE, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active (block 620). For example, the base station (e.g., using transmit processor 220, TX MIMO processor 230, modulator 232, antenna 234, controller/processor 240, memory 242, and/or scheduler 246) may transmit, to the UE, SPS transmissions in a plurality of SPS occasions that are according to the SPS configuration using at least one beam that is based at least in part on: whether a scheduling offset between the DCI and the plurality of SPS occasions satisfies a threshold time duration, whether a TCI state, associated with a CORESET that carries the DCI and is used to determine the at least one beam, changes while the SPS configuration is active, or whether a mapping of a TCI identifier, indicated by the DCI, to one or more TCI states changes while the SPS configuration is active, as described above.

Process 600 may include additional aspects, such as any single aspect or any combination of aspects described below and/or in connection with one or more other processes described elsewhere herein.

In a first aspect, at least one default beam is for an SPS occasion, of the plurality of SPS occasions, based at least in part on a determination that the scheduling offset between the DCI and the SPS occasion does not satisfy the threshold time duration.

In a second aspect, alone or in combination with the first aspect, the at least one default beam is associated with a single default TCI state or a plurality of default TCI states based at least in part on at least one of: whether the UE is configured with at least one TCI identifier that is mapped to a plurality of TCI states, or whether the UE is configured to enable a plurality of default beams.

In a third aspect, alone or in combination with one or more of the first and second aspects, the at least one default beam is associated with a single default TCI state that is based at least in part on a quasi-co-location assumption associated with a CORESET associated with a lowest CORESET identifier of CORESETs monitored by the UE in a latest slot.

In a fourth aspect, alone or in combination with one or more of the first through third aspects, the at least one default beam is associated with a plurality of default TCI states that are associated with a lowest TCI identifier of TCI identifiers that map to a plurality of TCI states.

In a fifth aspect, alone or in combination with one or more of the first through fourth aspects, at least one indicated beam is for an SPS occasion, of the plurality of SPS occasions, based at least in part on a determination that the scheduling offset between the DCI and the SPS occasion satisfies the threshold time duration.

In a sixth aspect, alone or in combination with one or more of the first through fifth aspects, the at least one indicated beam is associated with a single TCI state that is associated with a TCI identifier indicated in the DCI, or that is associated with a CORESET in which the DCI is received.

In a seventh aspect, alone or in combination with one or more of the first through sixth aspects, the at least one indicated beam is associated with a plurality of TCI states that are associated with a TCI identifier indicated in the DCI.

In an eighth aspect, alone or in combination with one or more of the first through seventh aspects, one or more first SPS occasions, of the plurality of SPS occasions, before an end of the threshold time duration are associated with a single TCI state, and one or more second SPS occasions, of the plurality of SPS occasions, after the threshold time duration are associated with a plurality of TCI states.

In a ninth aspect, alone or in combination with one or more of the first through eighth aspects, the scheduling offset between the DCI and the plurality of SPS occasions satisfies the threshold time duration based at least in part on a rule that indicates that the scheduling offset between the DCI and the plurality of SPS occasions is to satisfy the threshold time duration.

In a tenth aspect, alone or in combination with one or more of the first through ninth aspects, one or more first SPS occasions, of the plurality of SPS occasions, before an end of the threshold time duration include a same quantity of transmission occasions as a quantity of transmission occasions included in one or more second SPS occasions, of the plurality of SPS occasions, after the threshold time duration.

In an eleventh aspect, alone or in combination with one or more of the first through tenth aspects, one or more SPS occasions, of the plurality of SPS occasions, after the threshold time duration are to use only one of a plurality of TCI states indicated for the plurality of SPS occasions.

In a twelfth aspect, alone or in combination with one or more of the first through eleventh aspects, a TCI field is not present in the DCI, the TCI state associated with the CORESET is an original TCI state, and there is a change to the TCI state associated with the CORESET to a new TCI state while the SPS configuration is active.

In a thirteenth aspect, alone or in combination with one or more of the first through twelfth aspects, the at least one beam for an SPS occasion, of the plurality of SPS occasions, after the change is based at least in part on the new TCI state.

In a fourteenth aspect, alone or in combination with one or more of the first through thirteenth aspects, the at least one beam for an SPS occasion, of the plurality of SPS occasions, after the change is based at least in part on the original TCI state.

In a fifteenth aspect, alone or in combination with one or more of the first through fourteenth aspects, process 600 includes deactivating the SPS configuration based at least in part on a determination that there is a change to the TCI state associated with the CORESET to a new TCI state while the SPS configuration is active.

In a sixteenth aspect, alone or in combination with one or more of the first through fifteenth aspects, a change to the TCI state associated with the CORESET to a new TCI state while the SPS configuration is active indicates that an error exists.

In a seventeenth aspect, alone or in combination with one or more of the first through sixteenth aspects, the mapping of the TCI identifier to the one or more TCI states is an original mapping, and there is a change to the mapping to a new mapping of the TCI identifier to one or more different TCI states while the SPS configuration is active.

In an eighteenth aspect, alone or in combination with one or more of the first through seventeenth aspects, the at least one beam for an SPS occasion, of the plurality of SPS occasions, after the change is based at least in part on whether a quantity of the one or more TCI states is the same as a quantity of the one or more different TCI states.

In a nineteenth aspect, alone or in combination with one or more of the first through eighteenth aspects, the at least one beam for an SPS occasion, of the plurality of SPS occasions, after the change is based at least in part on the one or more different TCI states of the new mapping.

In a twentieth aspect, alone or in combination with one or more of the first through nineteenth aspects, the at least one beam for an SPS occasion, of the plurality of SPS occasions, after the change is based at least in part on the one or more TCI states of the original mapping.

In a twenty-first aspect, alone or in combination with one or more of the first through twentieth aspects, process 600 includes deactivating the SPS configuration based at least in part on a determination that there is a change to the mapping to a new mapping of the TCI identifier to one or more different TCI states while the SPS configuration is active.

In a twenty-second aspect, alone or in combination with one or more of the first through twenty-first aspects, a change to the mapping to a new mapping of the TCI identifier to one or more different TCI states while the SPS configuration is active indicates that an error exists.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving, from a base station, downlink control information (DCI) that activates a semi-persistent scheduling (SPS) configuration; and receiving, from the base station, SPS transmissions in a plurality of SPS occasions that are according to the SPS configuration using at least one beam that is based at least in part on: whether a scheduling offset between the DCI and the plurality of SPS occasions satisfies a threshold time duration, whether a transmission configuration indicator (TCI) state, associated with a control resource set (CORESET) that carries the DCI and is used to determine the at least one beam, changes while the SPS configuration is active, or whether a mapping of a TCI identifier, indicated by the DCI, to one or more TCI states changes while the SPS configuration is active.

Aspect 2: The method of Aspect 1, wherein at least one default beam is for an SPS occasion, of the plurality of SPS occasions, based at least in part on a determination that the scheduling offset between the DCI and the SPS occasion does not satisfy the threshold time duration.

Aspect 3: The method of Aspect 2, wherein the at least one default beam is associated with a single default TCI state or a plurality of default TCI states based at least in part on at least one of: whether the UE is configured with at least one TCI identifier that is mapped to a plurality of TCI states, or whether the UE is configured to enable a plurality of default beams.

Aspect 4: The method of any of Aspects 2-3, wherein the at least one default beam is associated with a single default TCI state that is based at least in part on a quasi-co-location assumption associated with a CORESET associated with a lowest CORESET identifier of CORESETs monitored by the UE in a latest slot.

Aspect 5: The method of any of Aspects 2-3, wherein the at least one default beam is associated with a plurality of default TCI states that are associated with a lowest TCI identifier of TCI identifiers that map to a plurality of TCI states.

Aspect 6: The method of Aspect 1, wherein at least one indicated beam is for an SPS occasion, of the plurality of SPS occasions, based at least in part on a determination that the scheduling offset between the DCI and the SPS occasion satisfies the threshold time duration.

Aspect 7: The method of Aspect 6, wherein the at least one indicated beam is associated with a single TCI state that is associated with a TCI identifier indicated in the DCI, or that is associated with a CORESET in which the DCI is received.

Aspect 8: The method of Aspect 6, wherein the at least one indicated beam is associated with a plurality of TCI states that are associated with a TCI identifier indicated in the DCI.

Aspect 9: The method of any of Aspects 1-8, wherein one or more first SPS occasions, of the plurality of SPS occasions, before an end of the threshold time duration are associated with a single TCI state, and one or more second SPS occasions, of the plurality of SPS occasions, after the threshold time duration are associated with a plurality of TCI states.

Aspect 10: The method of any of Aspects 1-9, wherein the scheduling offset between the DCI and the plurality of SPS occasions satisfies the threshold time duration based at least in part on a rule that indicates that the scheduling offset between the DCI and the plurality of SPS occasions is to satisfy the threshold time duration.

Aspect 11: The method of any of Aspects 1-10, wherein one or more first SPS occasions, of the plurality of SPS occasions, before an end of the threshold time duration include a same quantity of transmission occasions as a quantity of transmission occasions included in one or more second SPS occasions, of the plurality of SPS occasions, after the threshold time duration.

Aspect 12: The method of any of Aspects 1-11, wherein one or more SPS occasions, of the plurality of SPS occasions, after the threshold time duration are to use only one of a plurality of TCI states indicated for the plurality of SPS occasions.

Aspect 13: The method of any of Aspects 1-12, wherein a TCI field is not present in the DCI, and wherein the TCI state associated with the CORESET is an original TCI state, and there is a change to the TCI state associated with the CORESET to a new TCI state while the SPS configuration is active.

Aspect 14: The method of Aspect 13, wherein the at least one beam for an SPS occasion, of the plurality of SPS occasions, after the change is based at least in part on the new TCI state.

Aspect 15: The method of Aspect 13, wherein the at least one beam for an SPS occasion, of the plurality of SPS occasions, after the change is based at least in part on the original TCI state.

Aspect 16: The method of any of Aspects 1-15, further comprising: deactivating the SPS configuration based at least in part on a determination that there is a change to the TCI state associated with the CORESET to a new TCI state while the SPS configuration is active.

Aspect 17: The method of any of Aspects 1-16, further comprising: determining that an error exists when there is a change to the TCI state associated with the CORESET to a new TCI state while the SPS configuration is active.

Aspect 18: The method of any of Aspects 1-17, wherein the mapping of the TCI identifier to the one or more TCI states is an original mapping, and there is a change to the mapping to a new mapping of the TCI identifier to one or more different TCI states while the SPS configuration is active.

Aspect 19: The method of Aspect 18, wherein the at least one beam for an SPS occasion, of the plurality of SPS occasions, after the change is based at least in part on whether a quantity of the one or more TCI states is the same as a quantity of the one or more different TCI states.

Aspect 20: The method of any of Aspects 18-19, wherein the at least one beam for an SPS occasion, of the plurality of SPS occasions, after the change is based at least in part on the one or more different TCI states of the new mapping.

Aspect 21: The method of any of Aspects 18-19, wherein the at least one beam for an SPS occasion, of the plurality of SPS occasions, after the change is based at least in part on the one or more TCI states of the original mapping.

Aspect 22: The method of any of Aspects 1-21, further comprising: deactivating the SPS configuration based at least in part on a determination that there is a change to the mapping to a new mapping of the TCI identifier to one or more different TCI states while the SPS configuration is active.

Aspect 23: The method of any of Aspects 1-22, further comprising: determining that an error exists when there is a change to the mapping to a new mapping of the TCI identifier to one or more different TCI states while the SPS configuration is active.

Aspect 24: A method of wireless communication performed by a base station, comprising: transmitting, to a user equipment (UE), downlink control information (DCI) that activates a semi-persistent scheduling (SPS) configuration; and transmitting, to the UE, SPS transmissions in a plurality of SPS occasions that are according to the SPS configuration using at least one beam that is based at least in part on: whether a scheduling offset between the DCI and the plurality of SPS occasions satisfies a threshold time duration, whether a transmission configuration indicator (TCI) state, associated with a control resource set (CORESET) that carries the DCI and is used to determine the at least one beam, changes while the SPS configuration is active, or whether a mapping of a TCI identifier, indicated by the DCI, to one or more TCI states changes while the SPS configuration is active.

Aspect 25: The method of Aspect 24, wherein at least one default beam is for an SPS occasion, of the plurality of SPS occasions, based at least in part on a determination that the scheduling offset between the DCI and the SPS occasion does not satisfy the threshold time duration.

Aspect 26: The method of Aspect 25, wherein the at least one default beam is associated with a single default TCI state or a plurality of default TCI states based at least in part on at least one of: whether the UE is configured with at least one TCI identifier that is mapped to a plurality of TCI states, or whether the UE is configured to enable a plurality of default beams.

Aspect 27: The method of any of Aspects 25-26, wherein the at least one default beam is associated with a single default TCI state that is based at least in part on a quasi-co-location assumption associated with a CORESET associated with a lowest CORESET identifier of CORESETs monitored by the UE in a latest slot.

Aspect 28: The method of any of Aspects 25-26, wherein the at least one default beam is associated with a plurality of default TCI states that are associated with a lowest TCI identifier of TCI identifiers that map to a plurality of TCI states.

Aspect 29: The method of Aspect 24, wherein at least one indicated beam is for an SPS occasion, of the plurality of SPS occasions, based at least in part on a determination that the scheduling offset between the DCI and the SPS occasion satisfies the threshold time duration.

Aspect 30: The method of Aspect 29, wherein the at least one indicated beam is associated with a single TCI state that is associated with a TCI identifier indicated in the DCI, or that is associated with a CORESET in which the DCI is received.

Aspect 31: The method of Aspect 29, wherein the at least one indicated beam is associated with a plurality of TCI states that are associated with a TCI identifier indicated in the DCI.

Aspect 32: The method of any of Aspects 24-31, wherein one or more first SPS occasions, of the plurality of SPS occasions, before an end of the threshold time duration are associated with a single TCI state, and one or more second SPS occasions, of the plurality of SPS occasions, after the threshold time duration are associated with a plurality of TCI states.

Aspect 33: The method of any of Aspects 24-32, wherein the scheduling offset between the DCI and the plurality of SPS occasions satisfies the threshold time duration based at least in part on a rule that indicates that the scheduling offset between the DCI and the plurality of SPS occasions is to satisfy the threshold time duration.

Aspect 34: The method of any of Aspects 24-33, wherein one or more first SPS occasions, of the plurality of SPS occasions, before an end of the threshold time duration include a same quantity of transmission occasions as a quantity of transmission occasions included in one or more second SPS occasions, of the plurality of SPS occasions, after the threshold time duration.

Aspect 35: The method of any of Aspects 24-34, wherein one or more SPS occasions, of the plurality of SPS occasions, after the threshold time duration are to use only one of a plurality of TCI states indicated for the plurality of SPS occasions.

Aspect 36: The method of any of Aspects 24-36, wherein a TCI field is not present in the DCI, and wherein the TCI state associated with the CORESET is an original TCI state, and there is a change to the TCI state associated with the CORESET to a new TCI state while the SPS configuration is active.

Aspect 37: The method of Aspect 36, wherein the at least one beam for an SPS occasion, of the plurality of SPS occasions, after the change is based at least in part on the new TCI state.

Aspect 38: The method of Aspect 36, wherein the at least one beam for an SPS occasion, of the plurality of SPS occasions, after the change is based at least in part on the original TCI state.

Aspect 39: The method of any of Aspects 24-38, further comprising: deactivating the SPS configuration based at least in part on a determination that there is a change to the TCI state associated with the CORESET to a new TCI state while the SPS configuration is active.

Aspect 40: The method of any of Aspects 24-39, wherein a change to the TCI state associated with the CORESET to a new TCI state while the SPS configuration is active indicates that an error exists.

Aspect 41: The method of any of Aspects 24-40, wherein the mapping of the TCI identifier to the one or more TCI states is an original mapping, and there is a change to the mapping to a new mapping of the TCI identifier to one or more different TCI states while the SPS configuration is active.

Aspect 42: The method of Aspect 41, wherein the at least one beam for an SPS occasion, of the plurality of SPS occasions, after the change is based at least in part on whether a quantity of the one or more TCI states is the same as a quantity of the one or more different TCI states.

Aspect 43: The method of any of Aspects 41-42, wherein the at least one beam for an SPS occasion, of the plurality of SPS occasions, after the change is based at least in part on the one or more different TCI states of the new mapping.

Aspect 44: The method of any of Aspects 41-42, wherein the at least one beam for an SPS occasion, of the plurality of SPS occasions, after the change is based at least in part on the one or more TCI states of the original mapping.

Aspect 45: The method of any of Aspects 24-44, further comprising: deactivating the SPS configuration based at least in part on a determination that there is a change to the mapping to a new mapping of the TCI identifier to one or more different TCI states while the SPS configuration is active.

Aspect 46: The method of any of Aspects 24-45, wherein a change to the mapping to a new mapping of the TCI identifier to one or more different TCI states while the SPS configuration is active indicates that an error exists.

Aspect 47: An apparatus for wireless communication at a device, comprising a processor; memory coupled with the processor; and instructions stored in the memory and executable by the processor to cause the apparatus to perform the method of one or more of Aspects 1-23.

Aspect 48: A device for wireless communication, comprising a memory and one or more processors coupled to the memory, the one or more processors configured to perform the method of one or more of Aspects 1-23.

Aspect 49: An apparatus for wireless communication, comprising at least one means for performing the method of one or more of Aspects 1-23.

Aspect 50: A non-transitory computer-readable medium storing code for wireless communication, the code comprising instructions executable by a processor to perform the method of one or more of Aspects 1-23.

Aspect 51: A non-transitory computer-readable medium storing a set of instructions for wireless communication, the set of instructions comprising one or more instructions that, when executed by one or more processors of a device, cause the device to perform the method of one or more of Aspects 1-23.

Aspect 52: An apparatus for wireless communication at a device, comprising a processor; memory coupled with the processor; and instructions stored in the memory and executable by the processor to cause the apparatus to perform the method of one or more of Aspects 24-46.

Aspect 53: A device for wireless communication, comprising a memory and one or more processors coupled to the memory, the one or more processors configured to perform the method of one or more of Aspects 24-46.

Aspect 54: An apparatus for wireless communication, comprising at least one means for performing the method of one or more of Aspects 24-46.

Aspect 55: A non-transitory computer-readable medium storing code for wireless communication, the code comprising instructions executable by a processor to perform the method of one or more of Aspects 24-46.

Aspect 56: A non-transitory computer-readable medium storing a set of instructions for wireless communication, the set of instructions comprising one or more instructions that, when executed by one or more processors of a device, cause the device to perform the method of one or more of Aspects 24-46.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from a network entity, downlink control information (DCI) that activates a semi-persistent scheduling (SPS) configuration; and
      receive, from the network entity, SPS transmissions in a plurality of SPS occasions that are according to the SPS configuration using at least one beam that is based at least in part on:
         whether a scheduling offset between the DCI and the plurality of SPS occasions satisfies a threshold time duration,
         whether a transmission configuration indicator (TCI) state, associated with a control resource set (CORESET) that carries the DCI and is used to determine the at least one beam, changes while the SPS configuration is active, or
         whether a mapping of a TCI identifier, indicated by the DCI, to one or more TCI states changes while the SPS configuration is active.

2. The UE of claim 1, wherein at least one default beam is used for an SPS occasion, of the plurality of SPS occasions, when the scheduling offset between the DCI and the SPS occasion does not satisfy the threshold time duration.

3. The UE of claim 2, wherein the at least one default beam is associated with a single default TCI state based at least in part on whether the UE is configured with at least one TCI identifier that is mapped to a plurality of TCI states, and
   wherein the single default TCI state is based at least in part on a quasi-co-location assumption associated with a CORESET associated with a lowest CORESET identifier of CORESETs monitored by the UE in a latest slot.

4. The UE of claim 2, wherein the at least one default beam is associated with a plurality of default TCI states based at least in part on whether the UE is configured to enable a plurality of default beams, and
   wherein the plurality of default TCI states are associated with a lowest TCI identifier of TCI identifiers that map to a plurality of TCI states.

5. The UE of claim 1, wherein at least one indicated beam is used for an SPS occasion, of the plurality of SPS occasions, when the scheduling offset between the DCI and the SPS occasion satisfies the threshold time duration.

6. The UE of claim 5, wherein the at least one indicated beam is associated with a single TCI state that is associated with the TCI identifier indicated in the DCI, or that is associated with the CORESET in which the DCI is received, or wherein the at least one indicated beam is associated with a plurality of TCI states that are associated with the TCI identifier indicated in the DCI.

7. The UE of claim 1, wherein one or more first SPS occasions, of the plurality of SPS occasions, before an end of the threshold time duration are associated with a single TCI state, and one or more second SPS occasions, of the plurality of SPS occasions, after the threshold time duration are associated with a plurality of TCI states.

8. The UE of claim 1, wherein the scheduling offset between the DCI and the plurality of SPS occasions satisfies the threshold time duration based at least in part on a rule that indicates that the scheduling offset between the DCI and the plurality of SPS occasions is to satisfy the threshold time duration.

9. The UE of claim 1, wherein one or more first SPS occasions, of the plurality of SPS occasions, before an end of the threshold time duration include a same quantity of transmission occasions as a quantity of transmission occasions included in one or more second SPS occasions, of the plurality of SPS occasions, after the threshold time duration.

10. The UE of claim 1, wherein one or more SPS occasions, of the plurality of SPS occasions, after the threshold time duration are to use only one of a plurality of TCI states indicated for the plurality of SPS occasions.

11. The UE of claim 1, wherein a TCI field is not present in the DCI,
wherein the TCI state associated with the CORESET is a first TCI state, and there is a change to the TCI state associated with the CORESET to a second TCI state while the SPS configuration is active, and
wherein the at least one beam used for an SPS occasion, of the plurality of SPS occasions, after the change is based at least in part on the second TCI state.

12. The UE of claim 1, wherein a TCI field is not present in the DCI,
wherein the TCI state associated with the CORESET is a first TCI state, and there is a change to the TCI state associated with the CORESET to a second TCI state while the SPS configuration is active, and
wherein the at least one beam used for an SPS occasion, of the plurality of SPS occasions, after the change is based at least in part on the first TCI state.

13. The UE of claim 1, wherein the one or more processors are further configured to:
deactivate the SPS configuration or determine that an error exists when there is a change to the TCI state associated with the CORESET to a different TCI state while the SPS configuration is active.

14. The UE of claim 1, wherein the mapping of the TCI identifier to the one or more TCI states is a first mapping, and there is a change to the mapping to a second mapping of the TCI identifier to one or more different TCI states while the SPS configuration is active, and
wherein the at least one beam used for an SPS occasion, of the plurality of SPS occasions, after the change is based at least in part on whether a quantity of the one or more TCI states is the same as a quantity of the one or more different TCI states.

15. The UE of claim 1, wherein the mapping of the TCI identifier to the one or more TCI states is a first mapping, and there is a change to the mapping to a second mapping of the TCI identifier to one or more different TCI states while the SPS configuration is active, and
wherein the at least one beam used for an SPS occasion, of the plurality of SPS occasions, after the change is based at least in part on the one or more different TCI states of the second mapping.

16. The UE of claim 1, wherein the mapping of the TCI identifier to the one or more TCI states is a first mapping, and there is a change to the mapping to a second mapping of the TCI identifier to one or more different TCI states while the SPS configuration is active, and
wherein the at least one beam used for an SPS occasion, of the plurality of SPS occasions, after the change is based at least in part on the one or more TCI states of the first mapping.

17. The UE of claim 1, wherein the one or more processors are further configured to:
deactivate the SPS configuration or determine that an error exists when there is a change to the mapping to a different mapping of the TCI identifier to one or more different TCI states while the SPS configuration is active.

18. A network entity for wireless communication, comprising:
a memory; and
one or more processors, coupled to the memory, configured to:
transmit, to a user equipment (UE), downlink control information (DCI) that activates a semi-persistent scheduling (SPS) configuration; and
transmit, to the UE, SPS transmissions in a plurality of SPS occasions that are according to the SPS configuration using at least one beam that is based at least in part on:
whether a scheduling offset between the DCI and the plurality of SPS occasions satisfies a threshold time duration,
whether a transmission configuration indicator (TCI) state, associated with a control resource set (CORESET) that carries the DCI and is used to determine the at least one beam, changes while the SPS configuration is active, or
whether a mapping of a TCI identifier, indicated by the DCI, to one or more TCI states changes while the SPS configuration is active.

19. The network entity of claim 18, wherein at least one default beam is used for an SPS occasion, of the plurality of SPS occasions, when the scheduling offset between the DCI and the SPS occasion does not satisfy the threshold time duration.

20. The network entity of claim 18, wherein at least one indicated beam is used for an SPS occasion, of the plurality of SPS occasions, when the scheduling offset between the DCI and the SPS occasion satisfies the threshold time duration.

21. The network entity of claim 18, wherein a TCI field is not present in the DCI,
wherein the TCI state associated with the CORESET is a first TCI state, and there is a change to the TCI state associated with the CORESET to a second TCI state while the SPS configuration is active, and
wherein the at least one beam used for an SPS occasion, of the plurality of SPS occasions, after the change is based at least in part on the second TCI state.

22. The network entity of claim 18, wherein a TCI field is not present in the DCI,
wherein the TCI state associated with the CORESET is a first TCI state, and there is a change to the TCI state associated with the CORESET to a second TCI state while the SPS configuration is active, and wherein the at least one beam used for an SPS occasion, of the plurality of SPS occasions, after the change is based at least in part on the first TCI state.

23. The network entity of claim 18, wherein the mapping of the TCI identifier to the one or more TCI states is a first mapping, and there is a change to the mapping to a second mapping of the TCI identifier to one or more different TCI states while the SPS configuration is active, and
wherein the at least one beam used for an SPS occasion, of the plurality of SPS occasions, after the change is based at least in part on whether a quantity of the one or more TCI states is the same as a quantity of the one or more different TCI states.

24. The network entity of claim 18, wherein the mapping of the TCI identifier to the one or more TCI states is a first mapping, and there is a change to the mapping to a second mapping of the TCI identifier to one or more different TCI states while the SPS configuration is active, and
wherein the at least one beam used for an SPS occasion, of the plurality of SPS occasions, after the change is based at least in part on the one or more different TCI states of the second mapping.

25. The network entity of claim 18, wherein the mapping of the TCI identifier to the one or more TCI states is a first mapping, and there is a change to the mapping to a second mapping of the TCI identifier to one or more different TCI states while the SPS configuration is active, and
wherein the at least one beam used for an SPS occasion, of the plurality of SPS occasions, after the change is based at least in part on the one or more TCI states of the first mapping.

26. A method of wireless communication performed by a user equipment (UE), comprising:
receiving, from a network entity, downlink control information (DCI) that activates a semi-persistent scheduling (SPS) configuration; and
receiving, from the network entity, SPS transmissions in a plurality of SPS occasions that are according to the SPS configuration using at least one beam that is based at least in part on:
whether a scheduling offset between the DCI and the plurality of SPS occasions satisfies a threshold time duration,
whether a transmission configuration indicator (TCI) state, associated with a control resource set (CORESET) that carries the DCI and is used to determine the at least one beam, changes while the SPS configuration is active, or
whether a mapping of a TCI identifier, indicated by the DCI, to one or more TCI states changes while the SPS configuration is active.

27. The method of claim 26, wherein a TCI field is not present in the DCI,
wherein the TCI state associated with the CORESET is a first TCI state, and there is a change to the TCI state associated with the CORESET to a second TCI state while the SPS configuration is active, and
wherein the at least one beam used for an SPS occasion, of the plurality of SPS occasions, after the change is based at least in part on the second TCI state.

28. The method of claim 26, wherein a TCI field is not present in the DCI,
wherein the TCI state associated with the CORESET is a first TCI state, and there is a change to the TCI state associated with the CORESET to a second TCI state while the SPS configuration is active, and
wherein the at least one beam used for an SPS occasion, of the plurality of SPS occasions, after the change is based at least in part on the first TCI state.

29. A method of wireless communication performed by a network entity, comprising:
transmitting, to a user equipment (UE), downlink control information (DCI) that activates a semi-persistent scheduling (SPS) configuration; and
transmitting, to the UE, SPS transmissions in a plurality of SPS occasions that are according to the SPS configuration using at least one beam that is based at least in part on:
whether a scheduling offset between the DCI and the plurality of SPS occasions satisfies a threshold time duration,
whether a transmission configuration indicator (TCI) state, associated with a control resource set (CORESET) that carries the DCI and is used to determine the at least one beam, changes while the SPS configuration is active, or
whether a mapping of a TCI identifier, indicated by the DCI, to one or more TCI states changes while the SPS configuration is active.

30. The method of claim 29, wherein the mapping of the TCI identifier to the one or more TCI states is a first mapping, and there is a change to the mapping to a second mapping of the TCI identifier to one or more different TCI states while the SPS configuration is active, and
wherein the at least one beam used for an SPS occasion, of the plurality of SPS occasions, after the change is based at least in part on whether a quantity of the one or more TCI states is the same as a quantity of the one or more different TCI states.

* * * * *